(12) United States Patent
Igeta et al.

(10) Patent No.: US 12,111,543 B2
(45) Date of Patent: Oct. 8, 2024

(54) DISPLAY DEVICE

(71) Applicant: Japan Display Inc., Tokyo (JP)

(72) Inventors: Koichi Igeta, Tokyo (JP); Tenfu Nakamura, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/366,099

(22) Filed: Aug. 7, 2023

(65) Prior Publication Data
US 2024/0045274 A1    Feb. 8, 2024

(30) Foreign Application Priority Data

Aug. 8, 2022    (JP) .................................. 2022-126442

(51) Int. Cl.
  *G02F 1/1339*    (2006.01)
  *G02F 1/1333*    (2006.01)
  *G02F 1/1334*    (2006.01)
  *G02F 1/1362*    (2006.01)

(52) U.S. Cl.
  CPC ...... *G02F 1/1339* (2013.01); *G02F 1/133305* (2013.01); *G02F 1/1334* (2013.01); *G02F 1/136286* (2013.01)

(58) Field of Classification Search
  None
  See application file for complete search history.

(56) References Cited

U.S. PATENT DOCUMENTS

| | | | | |
|---|---|---|---|---|
| 2001/0015776 | A1* | 8/2001 | Someya | G09G 3/3659 349/43 |
| 2009/0103021 | A1* | 4/2009 | Manabe | G02F 1/13394 349/106 |
| 2010/0033667 | A1* | 2/2010 | Huang | G02F 1/133351 349/190 |
| 2012/0327347 | A1* | 12/2012 | Cho | G02F 1/133509 349/190 |
| 2016/0202516 | A1* | 7/2016 | Watanabe | G02F 1/1339 349/153 |
| 2016/0306224 | A1* | 10/2016 | Ishikawa | G02F 1/133512 |
| 2017/0131601 | A1* | 5/2017 | Jiang | G02F 1/1368 |
| 2019/0219860 | A1* | 7/2019 | Yin | G02F 1/133305 |
| 2020/0301221 | A1* | 9/2020 | Sasanuma | G02F 1/1339 |
| 2020/0335874 | A1* | 10/2020 | Mizusaki | H01Q 13/22 |
| 2021/0096406 | A1* | 4/2021 | Miyao | G02F 1/133615 |
| 2021/0333600 | A1 | 10/2021 | Nagasawa | |

FOREIGN PATENT DOCUMENTS

| JP | 2004-279983 A | 10/2004 |
|---|---|---|
| JP | 2020-112771 A | 7/2020 |

* cited by examiner

*Primary Examiner* — Ryan Crockett
(74) *Attorney, Agent, or Firm* — Maier & Maier, PLLC

(57) ABSTRACT

According to one embodiment, a display device includes a first substrate, a second substrate opposed to the first substrate, a sealing member bonding the first substrate with the second substrate, and a liquid crystal layer between the first substrate and the second substrate. From an aspect, the sealing member includes a first sealing member surrounding a display area including a plurality of pixels, and a second sealing member formed of a same material as the first sealing member and arranged in the display area.

16 Claims, 17 Drawing Sheets

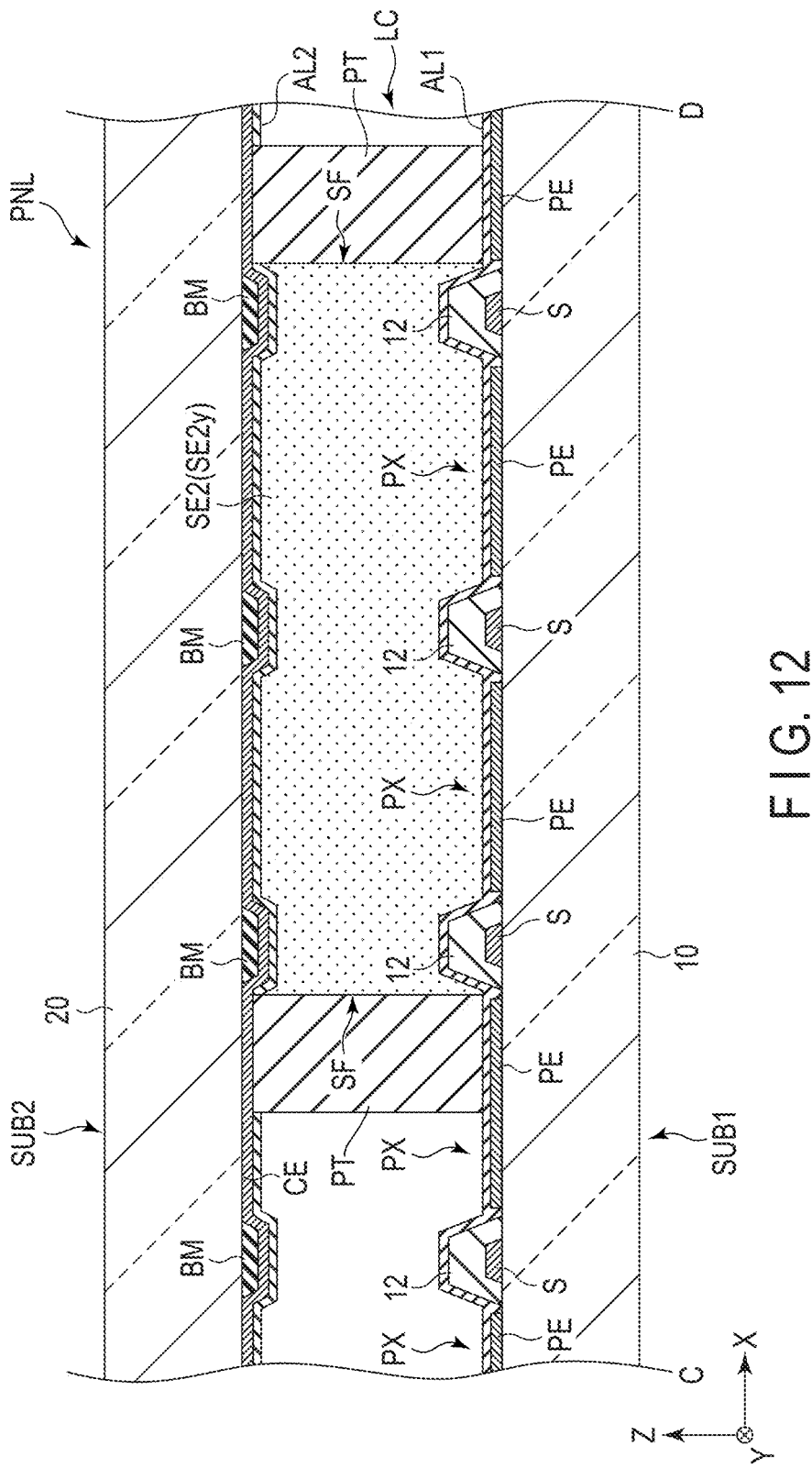
F I G. 12

DISPLAY DEVICE

CROSS-REFERENCE TO RELATED APPLICATIONS

This application is based upon and claims the benefit of priority from Japanese Patent Application No. 2022-126442, filed Aug. 8, 2022, the entire contents of which are incorporated herein by reference.

FIELD

Embodiments described herein relate generally to a display device.

BACKGROUND

A display device comprising a pair of substrates and a liquid crystal layer interposed between these substrates is well known. In general, a pair of substrates are bonded to each other by a sealing member surrounding a display area including pixels.

When vibration, impulse or pressure is applied to the display device of this type, a pair of substrates are displaced in some cases. If disorder in alignment of liquid crystal molecules contained in a liquid crystal layer occurs due to the displacement of the substrates, the display quality of the display device is degraded.

BRIEF DESCRIPTION OF THE DRAWINGS

FIG. 12 is a schematic cross-sectional view showing the display panel along line C-D in FIG. 11.

DETAILED DESCRIPTION

Figure 1:
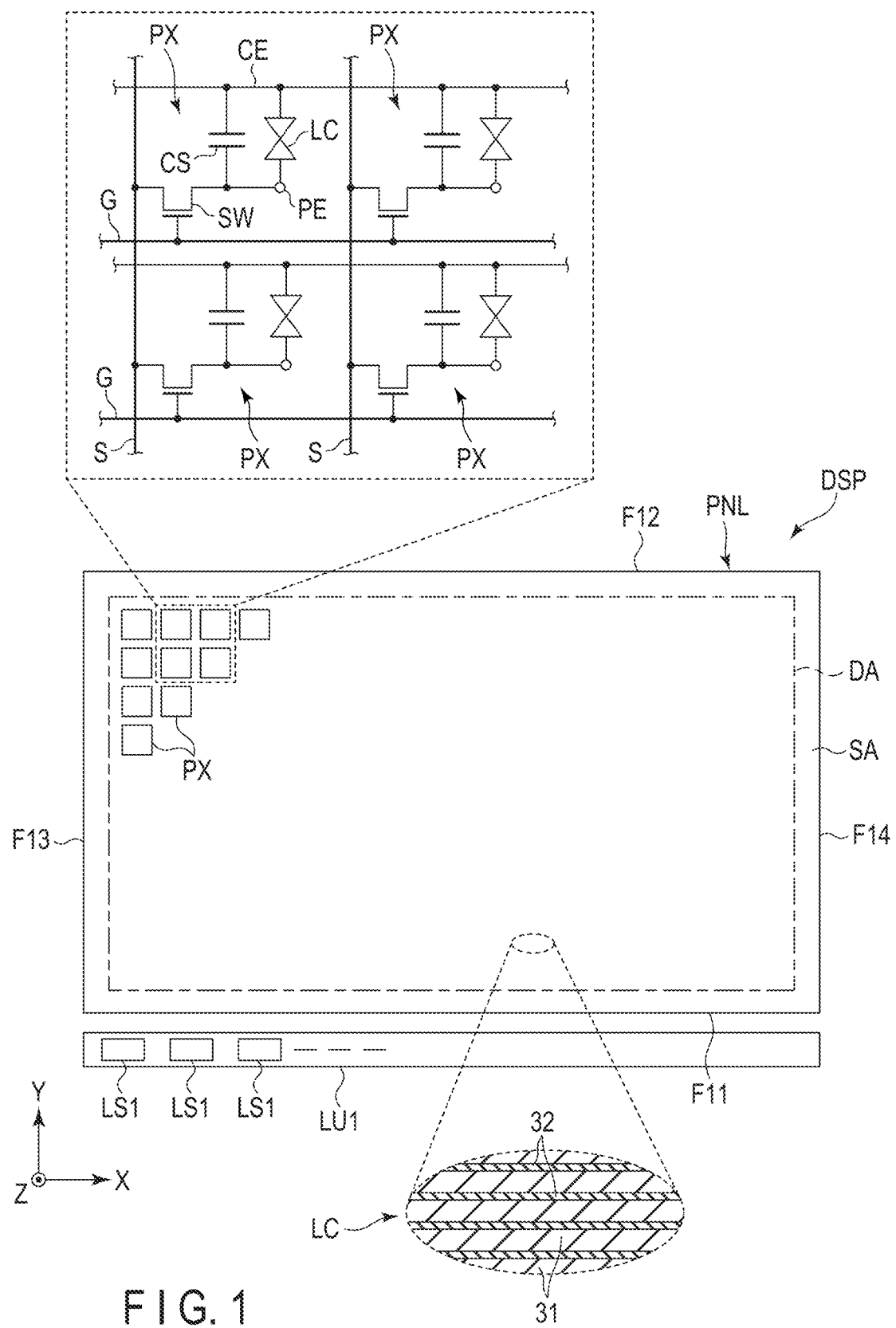
FIG. 1 is a view showing a configuration example of a display device according to a first embodiment.

In general, according to one embodiment, a display device comprises a first substrate, a second substrate opposed to the first substrate, a sealing member bonding the first substrate with the second substrate, and a liquid crystal layer between the first substrate and the second substrate.

From an aspect of the embodiment, the sealing member includes a first sealing member surrounding a display area including a plurality of pixels, and a second sealing member formed of a same member as the first sealing member and arranged in the display area.

From another aspect of the embodiment, the sealing member includes a first sealing member surrounding a display area including a plurality of pixels, and a second sealing member having a width larger than the pixel and arranged in the display area.

A display device capable of improving the display quality can be provided by these configurations.

Several embodiments will be described hereinafter with reference to the accompanying drawings.

The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction along the X-axis is referred to as a first direction, a direction along the Y-axis is referred to as a second direction, and a direction along the Z-axis is referred to as a third direction. Viewing various elements parallel to the third direction Z is referred to as plan view.

Each of the embodiments discloses a highly translucent liquid crystal display device to which polymer dispersed liquid crystal is applied (so-called transparent display) as an example of the display device. However, the configuration disclosed in each of the embodiments, particularly, the configuration relating to a sealing member bonding a pair of substrates can also be applied to a display device comprising a general liquid crystal layer which is not polymer dispersed liquid crystal, and the like.

First Embodiment

FIG. 1 is a view showing a configuration example of a display device DSP of a first embodiment. The display device DSP comprises a display panel PNL and a first light source unit LU1.

In the example of FIG. 1, the display panel PNL1 has a rectangular shape elongated in the first direction X as a shape in plan view, and has a first side surface F11 along the first direction X, a second side surface F12 along the first direction X, a third side surface F13 along the second direction Y, and a fourth side surface F14 along the second direction Y. The shape of the display panel PNL is not limited to the rectangular shape.

The display panel PNL has a display area DA for displaying an image and a frame-shaped peripheral area SA surrounding the display area DA. The display area DA includes a plurality of pixels PX arrayed in a matrix in the first direction X and the second direction Y.

The display panel PNL comprises a liquid crystal layer LC. As enlarged and schematically shown at a lower side of FIG. 1, the liquid crystal layer LC is composed of polymer dispersed liquid crystal containing polymer 31 and liquid crystal molecules 32. In an example, the polymer 31 is liquid crystal polymer. The polymer 31 is formed in a stripe shape extending along the first direction X and is aligned in the second direction Y. The liquid crystal molecules 32 are dispersed in gaps of the polymer 31 and aligned such that their major axes extend in the first direction X.

Each of the polymer 31 and the liquid crystal molecules 32 has optical anisotropy or refractive anisotropy. The response performance of the polymer 31 to the electric field is lower than the response performance of the liquid crystal molecules 32 to the electric field. In an example, the alignment direction of the polymers 31 is hardly varied irrespective of the presence or absence of the electric field. In contrast, the alignment direction of the liquid crystal molecules 32 is varied in response to the voltage applied to the liquid crystal layer LC.

In a state in which the voltage is not applied to the liquid crystal layer LC, optical axes of the respective polymer 31 and liquid crystal molecules 32 are parallel to each other and the light made incident on the liquid crystal layer LC is not substantially scattered in the liquid crystal layer LC and transmitted (transparent state).

In a state in which the voltage is applied to the liquid crystal layer LC, the optical axes of the respective polymer 31 and liquid crystal molecules 32 intersect each other and the light made incident on the liquid crystal layer LC is scattered in the liquid crystal layer LC (scattered state).

As expanded and shown at an upper side of FIG. 1, a plurality of scanning lines G and a plurality of signal lines S are arranged in the display area DA. The plurality of scanning lines G extend in the first direction X and are arranged in the second direction Y. The plurality of signal lines S extend in the second direction Y and are arranged in the first direction X.

Each pixel PX comprises a switching element SW, a pixel electrode PE, a common electrode CE, and a capacitance CS. The switching element SW is constituted by, for example, a thin-film transistor (TFT) and is electrically connected to the scanning line G and the signal line S. The pixel electrode PE is electrically connected to the switching element SW. The common electrode CE is opposed to, for example, a plurality of pixel electrodes PE.

The liquid crystal layer LC (particularly, liquid crystal molecules 32) is driven by an electric field generated between the pixel electrode PE and the common electrode CE. The capacitance CS is formed between, for example, an electrode having the same electric potential as the common electrode CE and an electrode having the same potential as the pixel electrode PE.

The first light source unit LU1 comprises a plurality of first light sources LS1 arranged in the first direction X. Each of the first light sources LS1 is opposed to the first side surface F11 to emit light to the first side surface F11. An optical element such as a lens may be arranged between each of the first light sources LS1 and the first side surface F11.

Figure 2:
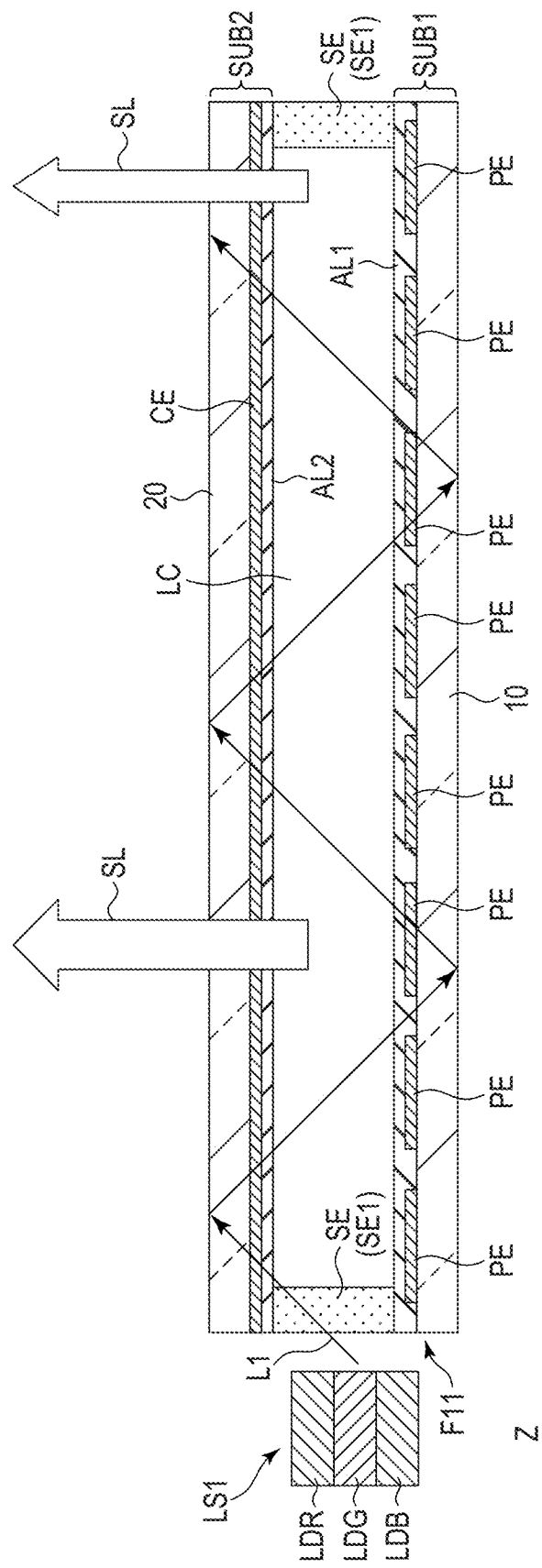
FIG. 2 is a schematic cross-sectional view showing the display device according to the first embodiment.

FIG. 2 is a schematically cross-sectional view showing the display device DSP. In this figure, a structure of the display panel PNL is schematically shown, and the elements such as the scanning lines G, the signal lines S, and the switching element SW are omitted.

In the example of FIG. 2, the first light source LS1 includes a light emitting element LDR emitting red light, a light emitting element LDG emitting green light, and a light emitting element LDB emitting blue light. For example, light emitting diodes can be used as these light emitting elements LDR, LDG, and LDB.

The display panel PNL comprises a first substrate SUB1, a second substrate SUB2 opposed to the first substrate SUB1, and a sealing member SE which bonds the first substrate SUB1 and the second substrate SUB2. The sealing member SE includes a first sealing member SE1 shown in FIG. 2 and a second sealing member SE2 to be described later. The liquid crystal layer LC is located between the first substrate SUB1 and the second substrate SUB2 and is sealed by the first sealing member SE1.

The first substrate SUB1 comprises a first transparent substrate 10, a plurality of pixel electrodes PE described above, and a first alignment film AL1 which is in contact with the liquid crystal layer LC. The second substrate SUB2 comprises a second transparent substrate 20, the common electrode CE described above, and a second alignment film AL2 which is in contact with the liquid crystal layer LC. The first transparent substrate 10 and the second transparent substrate 20 can be formed of, for example, glass or plastic.

As shown in FIG. 2, light L1 emitted from the first light source LS1 is made incident on the display panel PNL from the first side surface F11. The first side surface F11 includes a side surface of at least one of the first substrate SUB1 and the second substrate SUB2. The light L1 made incident on the display panel PNL is mainly guided in the second direction Y while repeatedly subjected to total reflection on an interface between the first transparent substrate 10 and air or an interface between the second transparent substrate 20 and air.

The light L1 is hardly scattered in the liquid crystal layer LC, in the vicinity of the pixels PX in the transparent state. For this reason, the light L1 hardly leaks from the first substrate SUB1 and the second substrate SUB2.

In contrast, the light L1 is scattered in the liquid crystal layer LC, in the vicinity of the pixels PX in the scattered state. The scattered light SL is emitted from the first substrate SUB1 and the second substrate SUB2 and is visually recognized as a display image. Gradation expression of the scattering degree (luminance) can also be implemented by defining the voltage applied to the pixel electrodes PE within a predetermined range in a step-by-step manner.

External light made incident on the first substrate SUB1 or the second substrate SUB2 is hardly scattered but transmitted through these substrates, in the vicinity of the pixels PX in the transparent state. In other words, the background on the first substrate SUB1 side can be visually recognized when the display panel PNL is seen from the second substrate SUB2 side, and the background on the second substrate SUB2 side can be visually recognized when the display panel PNL is seen from the first substrate SUB1 side.

As for an image display system, for example, a field sequential system in which first sub-frames displaying red images by turning on the light emitting elements LDR, second sub-frames displaying green images by turning on the light emitting elements LDG, and third sub-frames displaying blue images by turning on the light emitting elements LDB are repeated can be employed.

Figure 3:
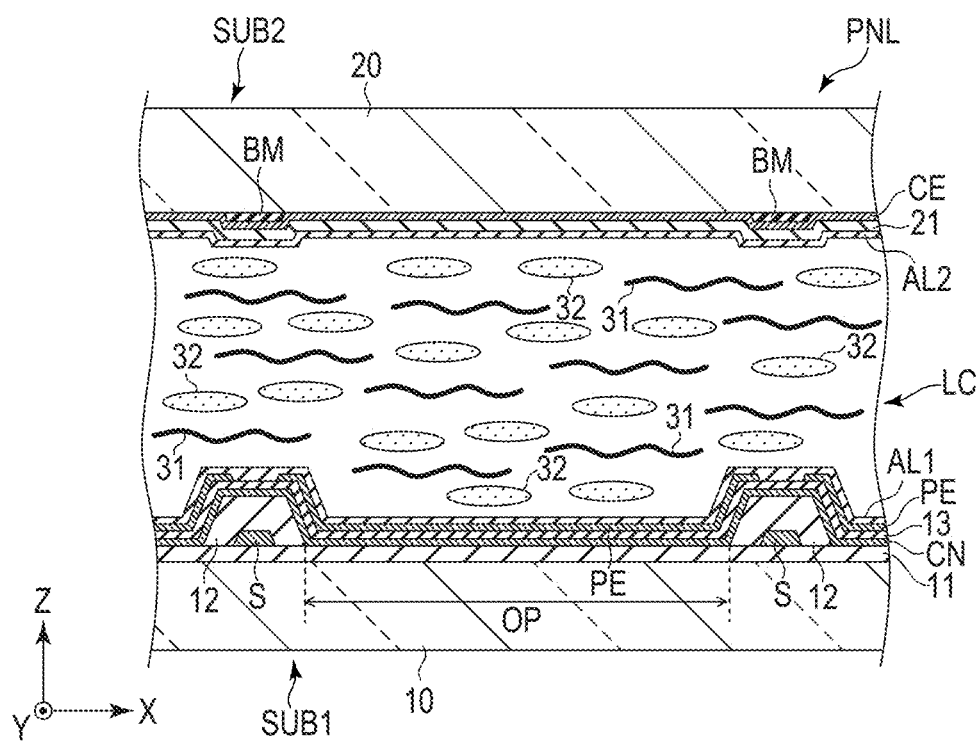
FIG. 3 is a schematic cross-sectional view showing a display panel according to the first embodiment.

FIG. 3 is a schematic cross-sectional view showing the display panel PNL. The first substrate SUB1 comprises insulating layers 11, 12, and 13 and a capacitive electrode CN in addition to the first transparent substrate 10, the first alignment film AL1, the scanning lines G, the signal lines S, and the pixel electrodes PE described above.

The insulating layer 11 is provided on the first transparent substrate 10. The insulating layer 11 can include a plurality of inorganic films which separate semiconductor layers of the switching elements SW, the scanning lines G, and the signal lines S from each other. The signal lines S are formed on the insulating layer 11.

The insulating layer 12 covers the signal lines S and protrudes toward the liquid crystal layer LC. Although not shown in the cross-section of FIG. 3, the insulating layer 12 is also provided above the scanning lines G. In other words, the insulating layer 12 has a grating shape including portions extending in the first direction X together with the scanning lines G, and portions extending in the second direction Y together with the signal lines S, in plan view. In each of the pixels PX, an aperture OP surrounded by the insulating layer 12 is formed.

The capacitive electrode CN is provided on the insulating layers 11 and 12 and is covered with the insulating layer 13. The pixel electrode PE is provided on the insulating film 13 at the aperture OP and is covered with the alignment film AL1. The pixel electrode PE is opposed to the capacitive electrode CN with the insulating film 13 sandwiched therebetween to form the capacitance CS of the pixel PX.

The second substrate SUB2 comprises a black matrix BM (light-shielding layer) and an insulating layer 21 in addition to the second transparent substrate 20, the common electrode CE, and the second alignment film AL2 described above. The black matrix BM is provided on a main surface of the second transparent substrate 20. For example, the black matrix BM has a grating shape which overlaps with the signal lines S, the scanning lines G, and the switching elements SW in the third direction Z.

The common electrode CE is provided on the main surface of the second transparent substrate 20 to cover the black matrix BM. The insulating layer 21 covers the common electrode CE. The second alignment film AL2 covers the insulating layer 21. The common electrode CE is opposed to a plurality of pixel electrodes PE. In addition, the common electrode CE has the same potential as the capacitive electrode CN.

The insulating layers 11, 13, and 21 are formed of, for example, transparent inorganic materials such as silicon oxide, silicon nitride, and silicon oxynitride. The insulating layer 12 is formed of, for example, a transparent organic material such as acrylic resin. The capacitive electrode CN, the pixel electrode PE, and the common electrode CE are formed of, for example, a transparent conductive material such as indium tin oxide (ITO) or indium zinc oxide (IZO). The black matrix BM is formed of, for example, a material having a light shielding property such as a metal or black resin having a low reflectance of visible light.

The liquid crystal layer LC contains the streaky polymer 31 and liquid crystal molecules 32 described above. The liquid crystal molecules 32 shown in FIG. 3 are in a state in which no potential difference is formed between the pixel electrode PE and the common electrode CE, and are aligned such that a director (long axes of the liquid crystal molecules 32) is substantially parallel to the direction of extension of the polymer 31. When the potential difference is formed between the pixel electrode PE and the common electrode CE, the liquid crystal molecules 32 are rotated such that the director approaches in a direction of the electric field.

Figure 4:
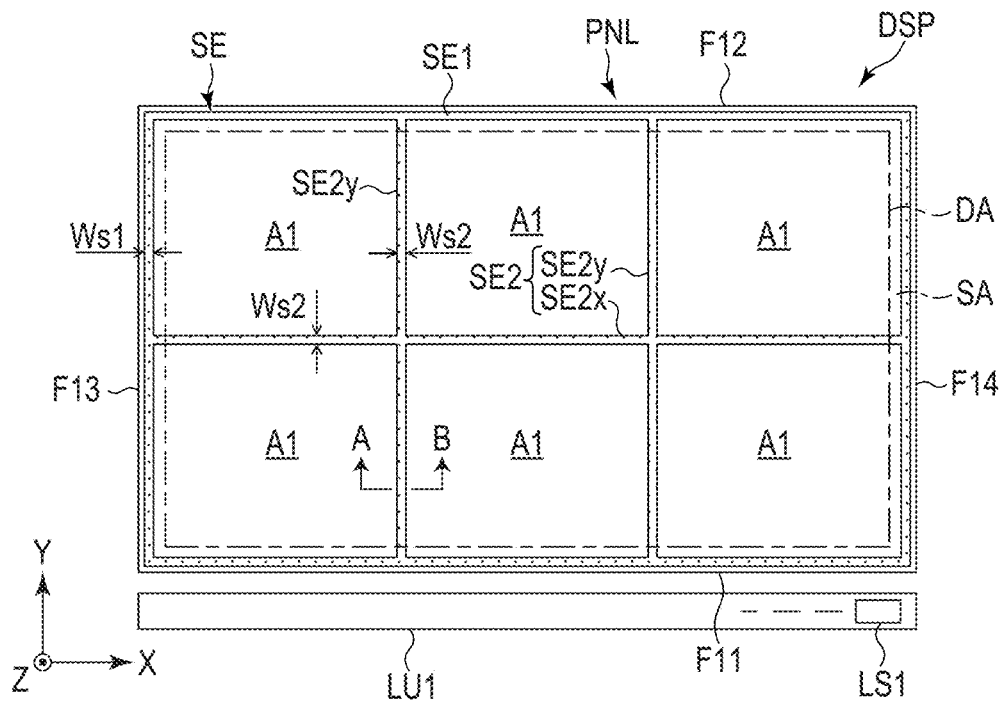
FIG. 4 is a schematic plan view showing the display device according to the first embodiment.

FIG. 4 is a schematic cross-sectional view showing the display device DSP. The sealing member SE includes a second sealing member SE2 in addition to the first sealing member SE1 that is also shown in FIG. 2. The first sealing member SE1 and the second sealing member SE2 are formed of the same material having an excellent translucency.

The first sealing member SE1 is arranged in the surrounding area SA and surrounds the display area DA. In other words, the first sealing member SE1 has a grating shape including a portion along the first side surface F11, a portion along the second side surface F12, a portion along the third side surface F13, and a portion along the fourth side surface F14, in plan view.

Most of the second sealing member SE2 is arranged in the display area DA. In the example of FIG. 4, the second sealing member SE2 includes a first portion SE2x extending parallel to the first direction X, and two second portions SE2y extending parallel to the second direction Y. The number of the first portion SE2x and the second portions SE2y included in the second sealing member SE2 is not limited to this example.

The first portion SE2x and the second portions SE2y intersect each other. Both end parts of each of the first portion SE2x and the second portions SE2y are connected to the first sealing member SE1. In other words, the second sealing member SE2 partition the inside of the first sealing member SE1 into a plurality of areas. In the example of FIG. 4, six first areas A1 having a rectangular shape surrounded by the first sealing member SE1 and the second sealing member SE2 are formed. The first areas A1 correspond to areas which do not overlap with the second sealing member SE2. In the example of FIG. 4, each of the first areas A1 has the same shape, which is not limited to this example.

The first sealing member SE1 has a width Ws1. The second sealing member SE2 (first portion SE2x and second portions SE2y) has a width Ws2. For example, the width Ws1 is an average value of the widths of the first sealing member SE1, and the width Ws2 is an average value of the widths of the second sealing member SE2. As an example, the widths Ws1 and Ws2 are substantially the same as each other. However, the widths Ws1 and Ws2 may be different from each other.

Figure 5:
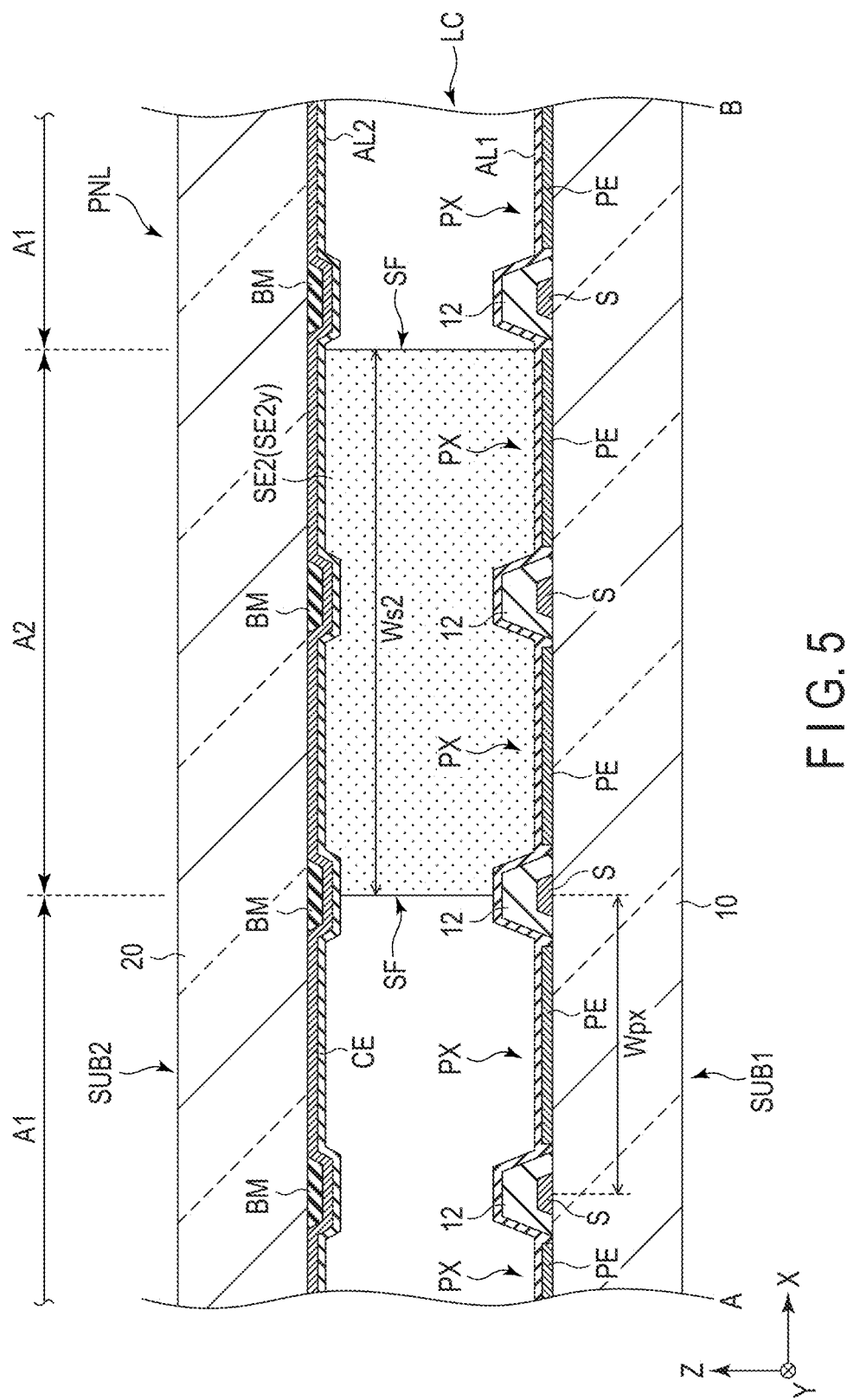
FIG. 5 is a schematic cross-sectional view showing the display panel along line A-B in FIG. 4.

FIG. 5 is a schematic cross-sectional view showing the display panel PNL along line A-B in FIG. 4. In this figure, the insulating layers 11, 13, and 21 and the capacitive electrode CN shown in FIG. 3 are omitted. In the following descriptions, an area overlapping with the second sealing member SE2 in plan view, of the display area DA, is referred to as a second area A2.

The second sealing member SE2 is in contact with both the first alignment film AL1 and the second alignment film AL2. The second sealing member SE2 has a pair of side surfaces SF. Each of these side surfaces SF is in contact with the liquid crystal layer LC.

The pixel PX has a width Wpx in the first direction X. For example, the width Wpx is a distance between centers of two signal lines S that sandwich one pixel PX. The width Wpx may also be referred to as a pitch of the pixel PX in the first direction X. The width Ws2 of the second sealing member SE2 is larger than the width Wpx (Ws2>Wpx). Similarly, a width of the pixel PX in the second direction Y (i.e., a distance between centers of two adjacent scanning lines G) is also larger than the width Ws2.

In the present embodiment, the pixels PX are arranged in not only the first areas A1, but also the second area A2. In other words, the second sealing member SE2 overlaps with a plurality of pixels PX arranged in the width direction (i.e., the first direction X in the example of FIG. 5). FIG. 5 shows an example in which the second sealing member SE2 overlaps with two pixels PX, but the second sealing member SE2 may overlap with more pixels PX (for example, five or more pixels PX).

In the manufacturing of the display device DSP, the first sealing member SE1 and the second sealing member SE2 are drawn of, for example, the same material discharged from the same dispenser, on the first substrate SUB1 or the second sealing member SE2. After that, the first substrate SUB1 and the second substrate SUB2 are bonded to each other.

As a method of introducing the liquid crystal layer LC in between the first substrate SUB1 and the second substrate SUB2, an injection method of injecting a liquid crystal material from an injection port provided in the first sealing member SE1 under a vacuum atmosphere after bonding the first substrate SUB1 and the second substrate SUB2, or a drop method of dropping a liquid crystal material on either of the substrates and bonding the substrates under a vacuum atmosphere before bonding the first substrate SUB1 and the second substrate SUB2, can be adopted.

In the present embodiment, an inside of the first sealing member SE1 is partitioned into a plurality of first areas A1 by the second sealing member SE2. In such a case, since an inlet communicating with each first area A1 needs to be provided in the injection method, employing the injection method is desirable from the viewpoint of simplification of the manufacturing process.

When the display panel PNL is deformed due to a stress resulting from vibration, impulse, pressure or the like, the first substrate SUB1 and the second substrate SUB2 are displaced, the alignment of the polymer 31 and the liquid crystal molecules 32 is disturbed, and non-uniformity occurs in the display images. When the non-uniformity occurs, the uniformity in display is damaged and a contrast ratio may also be lowered. When the size of the display panel PNL is small, the deformation amount is reduced by the first sealing member SE of the surrounding area SA even if the second sealing member SE2 is not provided. However, when the size is large, the deformation amount becomes large and the non-uniformity becomes remarkable.

In contrast, in the display device DSP of the present embodiment, the second sealing member SE2 is provided in the display area DA in addition to the first sealing member SE1. Therefore, even if a stress is applied, the first substrate SUB1 and the second substrate SUB2 can hardly be displaced, and the disturbance in alignment of the polymer 31 and the liquid crystal molecules 32 can be suppressed. As a result, occurrence of the non-uniformity can be suppressed, and the display quality of the display device DSP can be improved. Such an advantage is more remarkable as the size of the display panel PNL is larger.

In the present embodiment, the first sealing member SE1 and the second sealing member SE2 are formed of the same material. In this case, these sealing members SE1 and SE2 can be drawn by the same manufacturing device.

In the present embodiment, the width Ws2 of the second sealing member SE2 is larger than the width Wpx of the pixel PX. In this case, a desirable bond strength caused by the second sealing member SE2 can be expected, and the displacement of the first substrate SUB1 and the second substrate SUB2 can be suppressed effectively.

Second Embodiment

A second embodiment will be described. As regards constituent elements of a display device DSP which are not particularly described, the same elements as the first embodiments can be applied.

Figure 6:
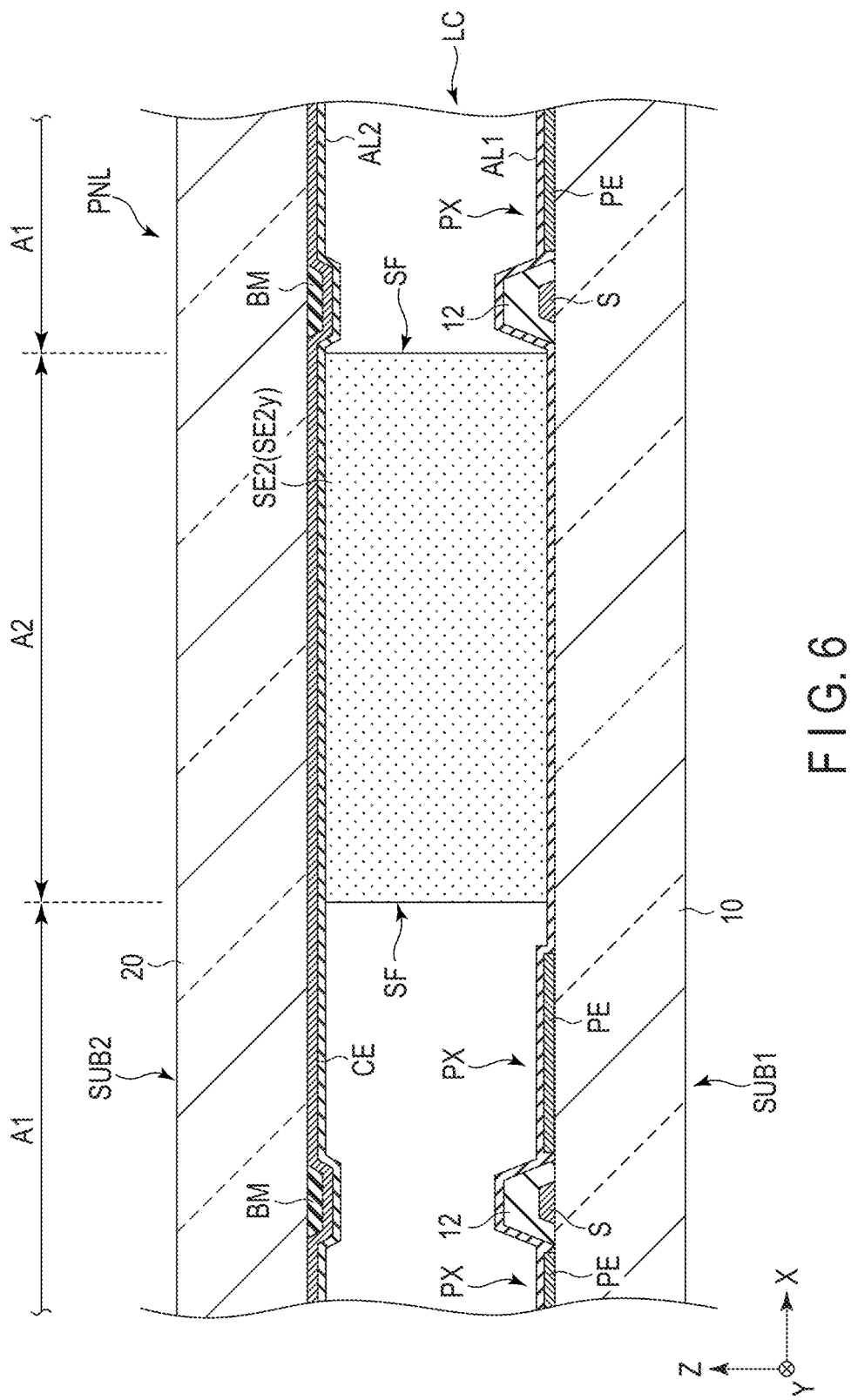
FIG. 6 is a schematic cross-sectional view showing a display device according to a second embodiment.

FIG. 6 is a schematic cross-sectional view showing a display device DSP (display panel PNL) according to the second embodiment. In the present embodiment, pixels PX are not arranged in a second area A2 overlapping with a second sealing member SE2. In other words, pixel electrodes PE and switching elements SW are not provided between a second sealing member SE2 and a first transparent substrate 10.

In the cross-section of FIG. 6, signal lines S, an insulating layer 12, and a black matrix BM are not arranged in the second area A2 either. The signal lines S intersect the first portion SE2$x$ shown in FIG. 4 in plan view. In other words, the signal lines S partially overlap with the first portion SE2$x$ but do not overlap with the second portions SE2$y$ in plan view.

The relationship between scanning lines G and the second sealing member SE2 is the same as the relationship between the signal lines S and the second sealing member SE2. In other words, the scanning lines G do not overlap with the first portion SE2$x$ but partially overlap with the second portions SE2$y$ in plan view.

When the pixels PX are not arranged in the second area A2 overlapping with the second sealing member SE2, similarly to the present embodiment, partial lack of the images displayed in the display area DA can be suppressed.

Third Embodiment

A third embodiment will be described. As regards constituent elements of a display device DSP which are not particularly described, the same elements as the first embodiments can be applied.

Figure 7:
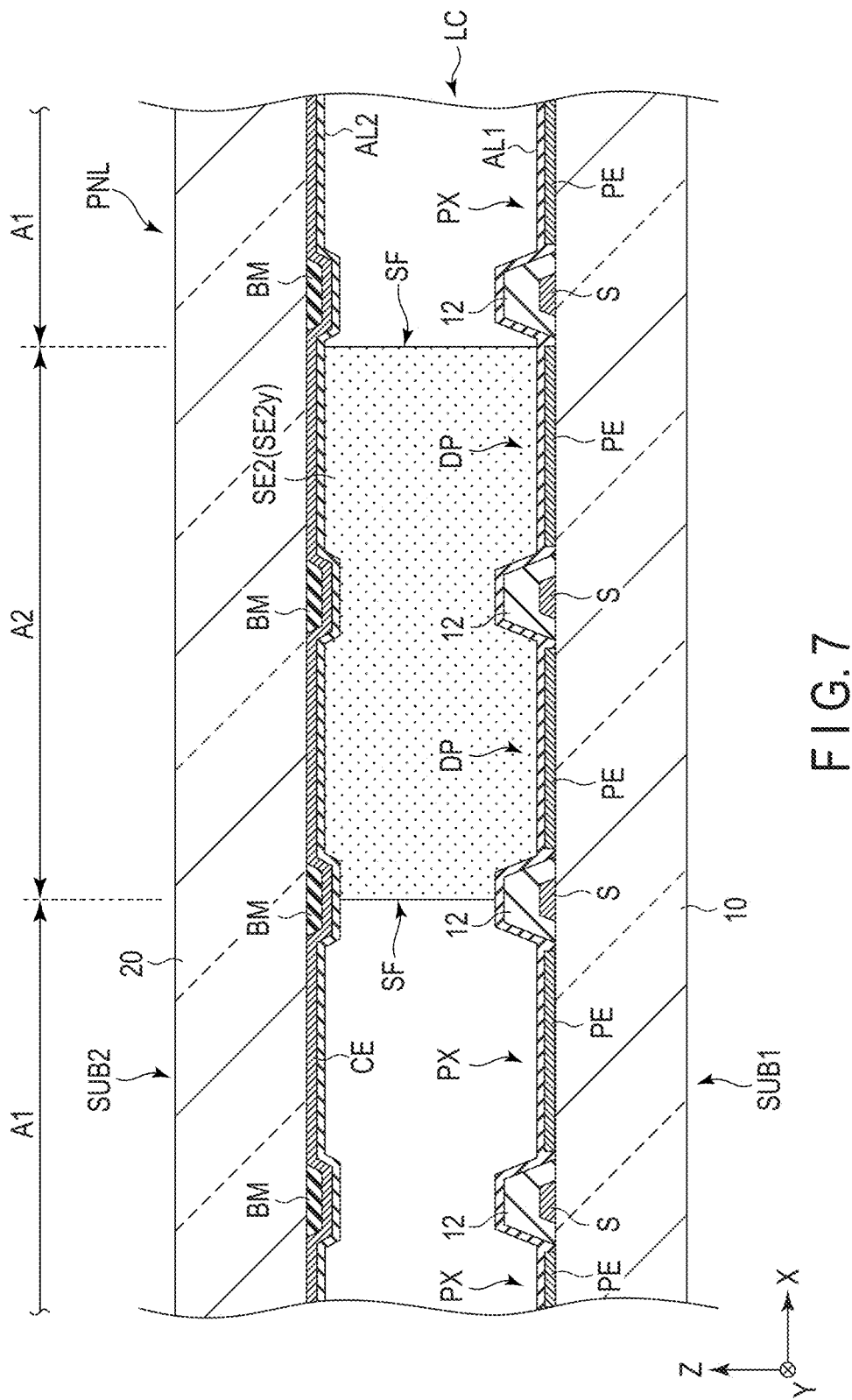
FIG. 7 is a schematic cross-sectional view showing a display device according to a third embodiment.

FIG. 7 is a schematic cross-sectional view showing a display device DSP (display panel PNL) according to the third embodiment. In the present embodiment, dummy pixels DP are arranged in a second area A2 overlapping with a second sealing member SE2.

The dummy pixel DP is a pixel which does not display images (i.e., a pixel which does not form a potential difference between a pixel electrode PE and a common electrode CE). The dummy pixel DP may comprise a switching element SW and the pixel electrode PE, similarly to the pixel PX, or may not comprise at least one of the switching element SW and the pixel electrode PE. In addition, the dummy pixel DP may comprise the switching element SW and the pixel electrode PE, similarly to the pixel PX, but they may not be electrically connected to each other.

The dummy pixels DP are arranged in not only an area overlapping with the second portion SE2y of the second sealing member SE2 as shown in FIG. 7, but also an area overlapping with the first portion SE2x. The size of the dummy pixel DP is the same as, for example, the pixel PX.

A signal line S, a scanning line G, and a black matrix BM are provided in the dummy pixel DP, too. In other words, a plurality of signal lines S provided in the display panel PNL are aligned at a constant pitch in any of the first areas A1 and the second area A2. In other words, a plurality of scanning lines G provided in the display panel PNL are aligned at a constant pitch in any of the first areas A1 and the second area A2.

When the dummy pixels DP are arranged in the second area A2 similarly to the present embodiment, the aperture ratio of the display area DA can be made uniform entirely. The transparency of the display area DA is also made uniform entirely.

In addition, variation in the capacitance and the load of the scanning lines G and the signal lines S is suppressed as compared with a case where the pixels PX and the dummy pixels DP are not arranged in the second area A2 similarly to the second embodiment. Electric stability of the display device DSP can be thereby obtained.

Figure 8:
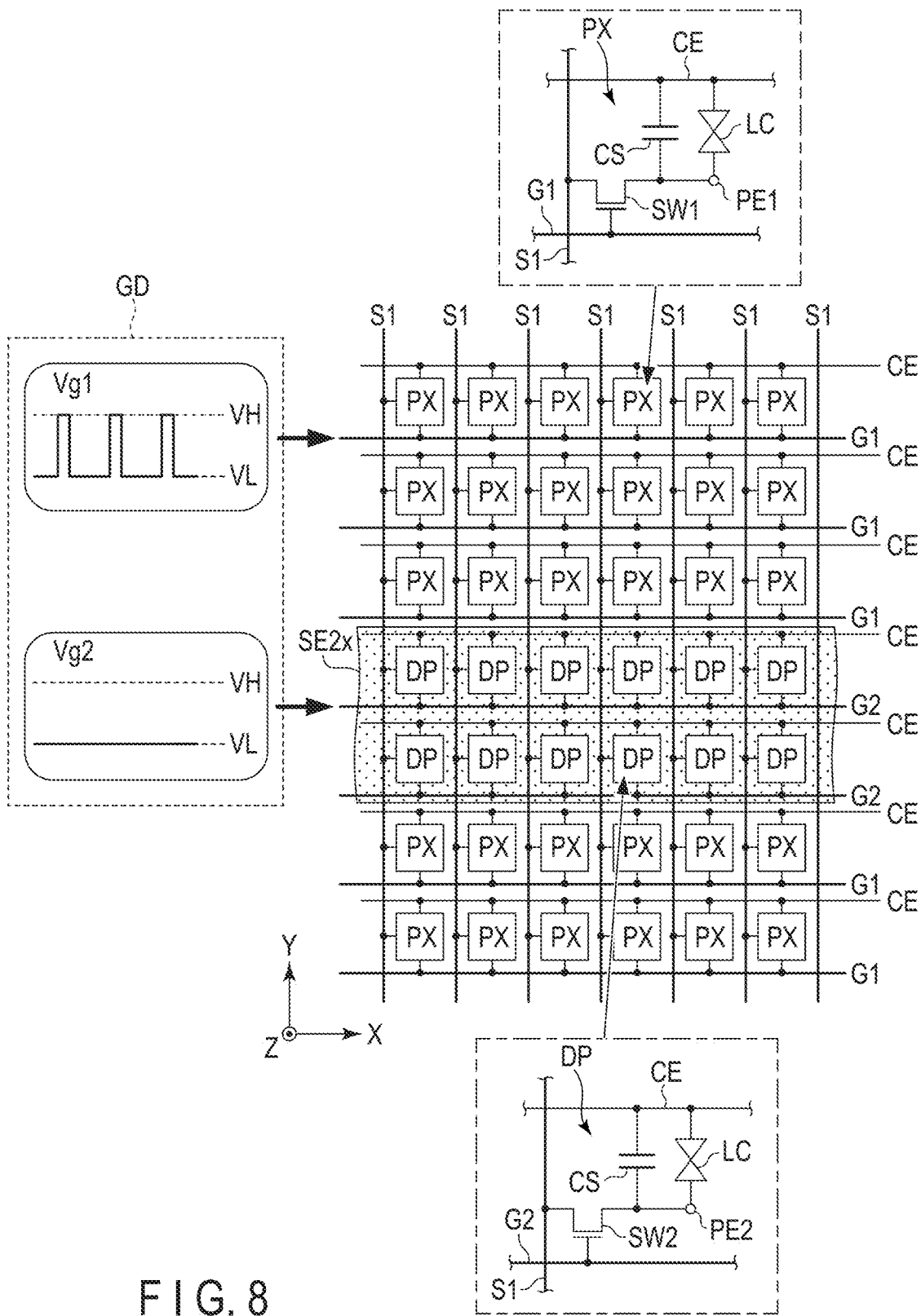
FIG. 8 is a view showing an example of a voltage applied to a scanning line in the third embodiment.
Figure 9:
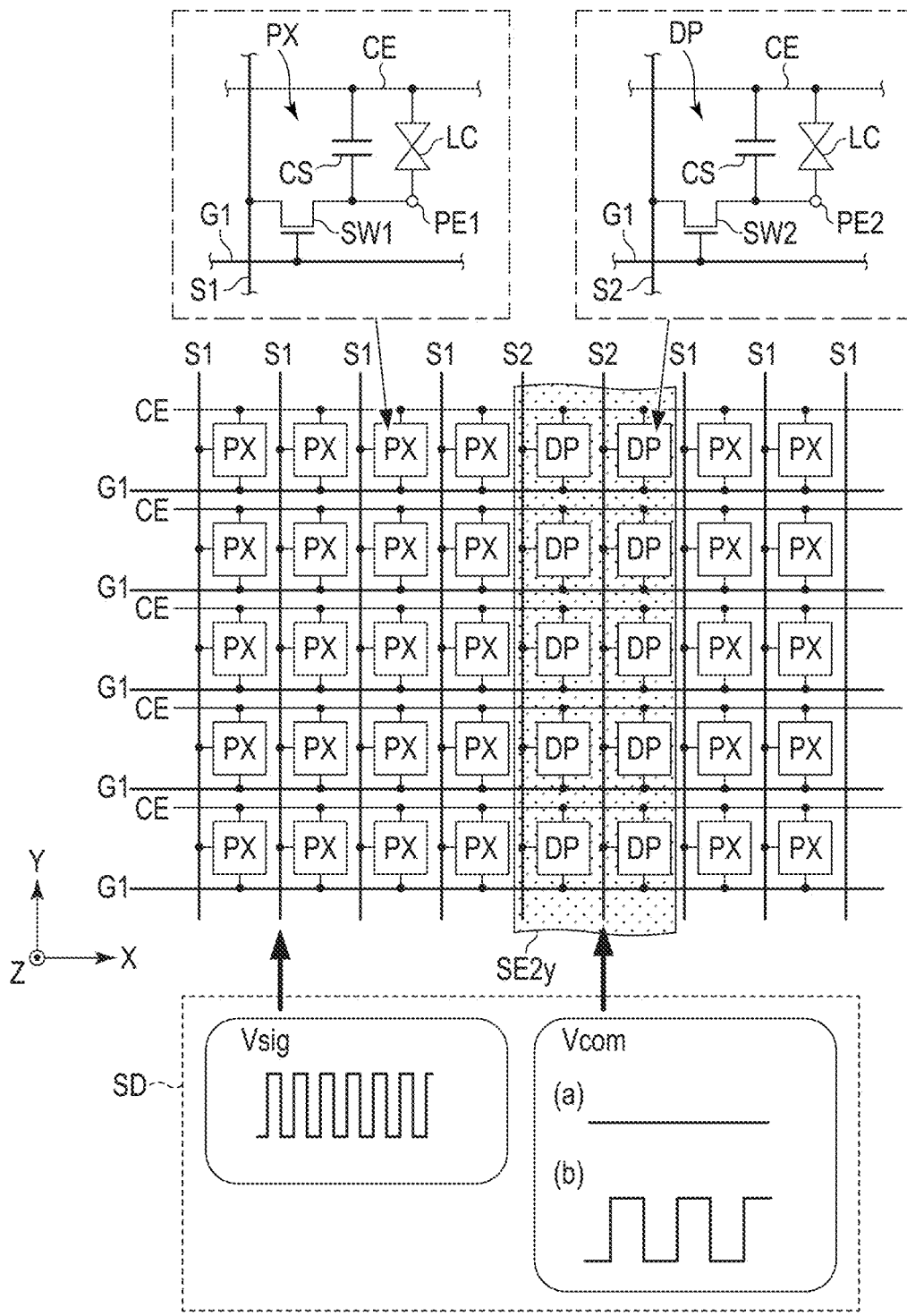
FIG. 9 is a view showing an example of a voltage applied to a signal line in the third embodiment.

FIG. 8 is a view showing an example of a voltage applied to the scanning lines G. FIG. 9 is a view showing an example of a voltage applied to the signal lines S. In FIG. 8, a plurality of dummy pixels DP overlap with the first portion SE2x parallel to the scanning lines G and are arranged in the first direction X. In FIG. 9, a plurality of dummy pixels DP overlap with the second portion SE2y parallel to the signal lines S and are arranged in the second direction Y.

In the following descriptions, the pixel electrode PE and the switching element SW arranged in the pixel PX are referred to as a first pixel electrode PE1 and a first switching element SW1, respectively, and the pixel electrode PE and the switching element SW arranged in the dummy pixel DP are referred to as a second pixel electrode PE2 and a second switching element SW2, respectively.

In addition, as shown in FIG. 8, a scanning line G connected to the first switching element SW1 of the pixel PX which does not overlap with the first portion SE2x is referred to as a first scanning line G1, and a scanning line G connected to the second switching element SW2 of the dummy pixel DP which overlaps with the first portion SE2x is referred to as a second scanning line G2. Furthermore, as shown in FIG. 9, a signal line S connected to the first switching element SW1 of the pixel PX which does not overlap with the second portion SE2y is referred to as a first signal line S1, and a signal line S connected to the second switching element SW2 of the dummy pixel DP which overlaps with the second portion SE2y is referred to as a second signal line S2.

Each of the scanning lines G1 and G2 is connected to a gate driver GD shown in FIG. 8. The gate driver GD applies a gate voltage Vg1 having a waveform in which low potentials VL and high potentials VH are alternately repeated, to each of the first scanning lines G1. The low potential VL is an electric potential for turning off the first switching element SW1. The high potential VH is an electric potential for turning on the first switching element SW1.

In contrast, the gate driver GD applies a gate voltage Vg2 having a constant waveform of the low potential VL, to each of the second scanning lines G2. The second switching element SW2 is not turned on by the gate voltage Vg2.

Each of the signal lines S1 and S2 is connected to a source driver SD shown in FIG. 9. The source driver SD sequentially applies a display voltage Vsig which is to be supplied to each of the first pixel electrodes PE1 of the plurality of pixels PX arranged in the second direction Y, to each of the first signal lines S1. The display voltage Vsig has an electric potential different from an electric potential of the common voltage Vcom applied to the common electrode CE.

In contrast, the source driver SD applies the same common voltage Vcom as the common electrode CE to each of the second signal lines S2. The common voltage Vcom may be constant as shown in (a) of FIG. 9. In addition, the common voltage Vcom may be inverted for each frame as shown in (b) of FIG. 9.

When the constant gate voltage Vg2 is applied to each of the second scanning lines G2, a circuit for driving the second scanning line G2 does not need to be provided in the gate driver GD, as shown in the example of FIG. 8. The configuration of the gate driver GD can be therefore simplified. In addition, the electric potential of each second scanning line G2 becomes the same as that of most of the first scanning lines G1 and electrically stable drive can be implemented, by setting the gate voltage Vg2 to the low potential VL.

When the common voltage Vcom is applied to each second signal line S2, a potential difference is not generated between the second signal line S2 and the common electrode CE or the above-described capacitive electrode CN, as shown in the example of FIG. 9. Therefore, electrically stable drive can be implemented, and action of undesired electric field on the liquid crystal layer LC can be suppressed, too.

Fourth Embodiment

A fourth embodiment will be described. As regards constituent elements of a display device DSP which are not particularly described, the same elements as those of each of the above-described embodiments can be applied.

Figure 10:
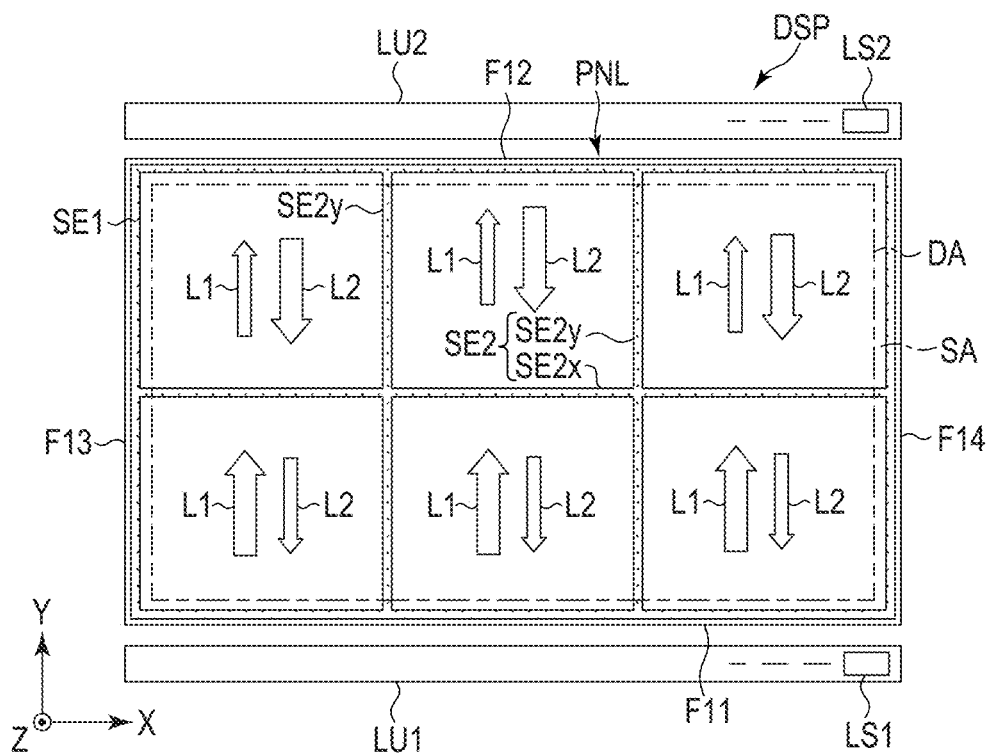
FIG. 10 is a schematic plan view showing a display device according to a fourth embodiment.

FIG. 10 is a schematic plan view showing a display device DSP according to the fourth embodiment. In the present embodiment, the display device DSP further comprises a second light source unit LU2. The second light source unit LU2 comprises a plurality of second light sources LS2 arranged along a second side surface F12.

The second light sources LS2 emit light toward the second side surface F12. The second side surface F12 includes a side surface of at least one of a first substrate SUB1 and a second substrate SUB2. For example, similarly to the first light source LS1 shown in FIG. 2, the second light source LS2 includes a light emitting element LDR emitting red light, a light emitting element LDG emitting green light, and a light emitting element LDB emitting blue light.

Part of light L1 emitted from the first light sources LS1 is absorbed into and scattered by a first portion SE2x of a second sealing member SE2. For this reason, the strength of the light L1 is varied before and after passing through the first portion SE2x. Based on this, the uniformity in luminance of the image displayed in the display area DA may be damaged in the configuration of each of the above-described embodiments.

In contrast, in the present embodiment, the light L2 emitted from the second light sources LS2 is guided from the second side surface F12 toward the first side surface F11. Part of the light L2 is also absorbed into and scattered by the first portion SE2x. As a result, the strength of a combination of the light L1 and the light L2 becomes substantially uniform in the display area DA and the luminance of the displayed image is made uniform.

Fifth Embodiment

A fifth embodiment will be described. As regards constituent elements of a display device DSP which are not particularly described, the same elements as those of each of the above-described embodiments can be applied.

Figure 11:
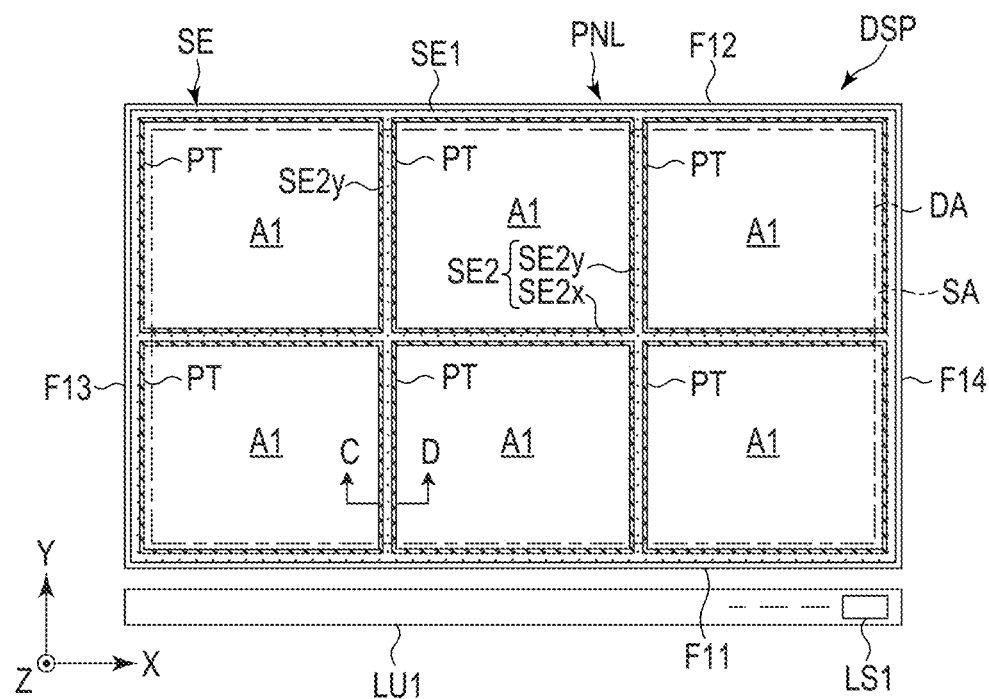
FIG. 11 is a schematic plan view showing a display device according to a fifth embodiment.

FIG. 11 is a schematic plan view showing a display device DSP according to the fifth embodiment. In the present embodiment, the display device DSP comprises a wall portion PT arranged along an inner surface of each first area A1. The wall portion PT is formed of, for example, an organic material.

In an example of FIG. 11, the wall portion PT has a rectangular shape along both of a first sealing member SE1 and a second sealing member SE2. In the other example, the wall portion PT may be provided along the only second sealing member SE2.

FIG. 12 is a schematic cross-sectional view showing the display panel PNL along line C-D in FIG. 11. The wall portion PT covers a side surface SF of the second sealing member SE2. A side wall of the first sealing member SE1 is also covered with the wall portion PT although not represented in the cross-section of FIG. 12.

In the example of FIG. 12, the wall portion PT is provided on the second substrate SUB2 and its end is in contact with the first alignment film AL1. In the other example, the wall portion PT may be provided on the first substrate SUB1 and its end may be in contact with the second alignment film AL2. In addition, the wall portions PT may be provided on both the first substrate SUB1 and the second substrate SUB2, and their ends or alignment films AL1 and AL2 formed on these ends may be in contact. When the wall portion PT is provided on the first substrate SUB1, the wall portion PT may be formed of the same material as the insulating layer 12.

In a case where the liquid crystal layer LC is formed by the above-described drop method, if the liquid crystal layer LC is in contact with an uncured first sealing member SE1 and an uncured second sealing member SE2, the sealing members SE1 and SE2 may be eluted into the liquid crystal layer LC. In contrast, if the wall portion PT is provided similarly to the present embodiment, contact between the uncured first sealing members SE1 and SE2 and the liquid crystal layer LC can be suppressed.

Sixth Embodiment

A sixth embodiment will be described. As regards constituent elements of a display device DSP which are not particularly described, the same elements as those of each of the above-described embodiments can be applied.

Figure 13:
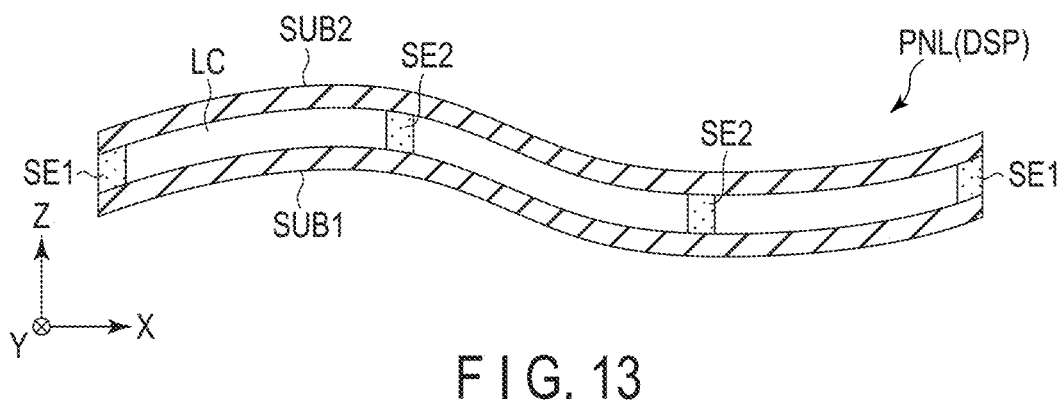
FIG. 13 is a schematic cross-sectional view showing a display device according to a sixth embodiment.

FIG. 13 is a schematic cross-sectional view showing a display device DSP according to the sixth embodiment. In the present embodiment, a first substrate SUB1 and a second substrate SUB2 are flexible. The first substrate SUB1 and the second substrate SUB2 can be implemented by, for example, forming the first transparent substrate 10 and the second transparent substrate 20 of flexible plastic such as polyimide.

In the example of FIG. 13, a display panel PNL is curved in a cross-section along the X-Z plane parallel to the first direction X and the third direction Z. The display panel PNL may be curved in a cross-section along the Y-Z plane parallel to the second direction Y and the third direction Z.

The display panel PNL has a flat plate shape parallel to the first direction X and the second direction Y in a state in which an external force is not applied to the panel, and may be curved when an external force is applied. In the other example, the display panel PNL may be fixed in a preliminarily curved state.

When the display panel PNL is curved, displacement between the first substrate SUB1 and the second substrate SUB2 occurs. When such displacement occurs, the alignment of the polymer and the liquid crystal molecules contained in the liquid crystal layer LC is disturbed due to forces such as a shear stress parallel to each substrate and a compressive stress perpendicular to each substrate, and non-uniformity occurs in display images.

In contrast, if the second sealing member SE2 is arranged, the displacement of the substrates SUB1 and SUB2 in the display area DA can be suppressed as compared with a case where the first substrate SUB1 and the second substrate SUB2 are bonded by the only first sealing member SE1. As a result, non-uniformity in display images is suppressed, and the display quality of the display device DSP is improved.

Seventh Embodiment

A seventh embodiment will be described. As regards constituent elements of a display device DSP which are not particularly described, the same elements as those of each of the above-described embodiments can be applied.

Figure 14:
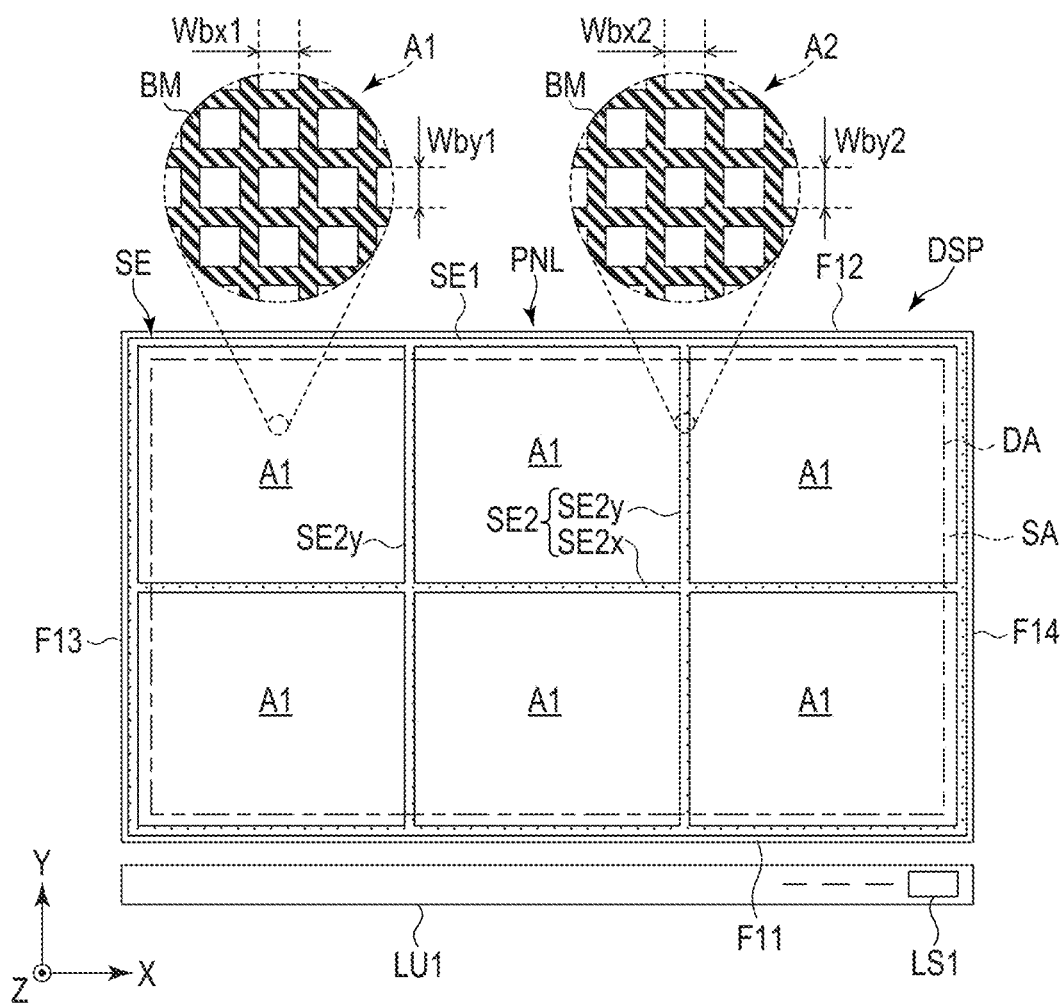
FIG. 14 is a schematic plan view showing a display device according to a seventh embodiment.

FIG. 14 is a schematic plan view showing a display device DSP according to the seventh embodiment. In the present embodiment, an aperture ratio in a first area A1 is equivalent to an aperture ratio in a second area A2.

The aperture ratio corresponds to a rate of a light transmissive area included per unit area. The light transmissive area corresponds to, for example, an area which does not overlap with a light shielding portion such as a black matrix BM or lines (such as scanning lines G and signal lines S).

In the example of FIG. 14, a shape of the black matrix BM in each of the first area A1 and the second area A2 is the same. In other words, an aperture width Wbx1 of the black matrix BM in the first direction X, in the first area A1 is the same as an aperture width Wbx2 of the black matrix BM in the first direction X, in the second area A2. In addition, an aperture width Wby1 of the black matrix BM in the second direction Y, in the first area A1 is the same as an aperture width Wby2 of the black matrix BM in the second direction Y, in the second area A2. The lines such as the scanning lines G and the signal lines S overlap with the black matrix BM, and the aperture ratios of the first area A1 and the second area A2 are substantially determined depending on the shape of the black matrix BM.

If a light shielding portion such as the black matrix BM is not provided in the second area A2, the uniformity in transmittance of the first area A1 and the second area A2 is degraded, and the display quality may also be degraded. In contrast, if the aperture ratio of the first area A1 is equivalent to the aperture ratio of the second area A2, the transmittance of the display panel PNL is made uniform in the entire display area DA, and the display quality is also improved.

Eighth Embodiment

An eighth embodiment will be described. As regards constituent elements of a display device DSP which are not particularly described, the same elements as those of each of the above-described embodiments can be applied.

Figure 15:
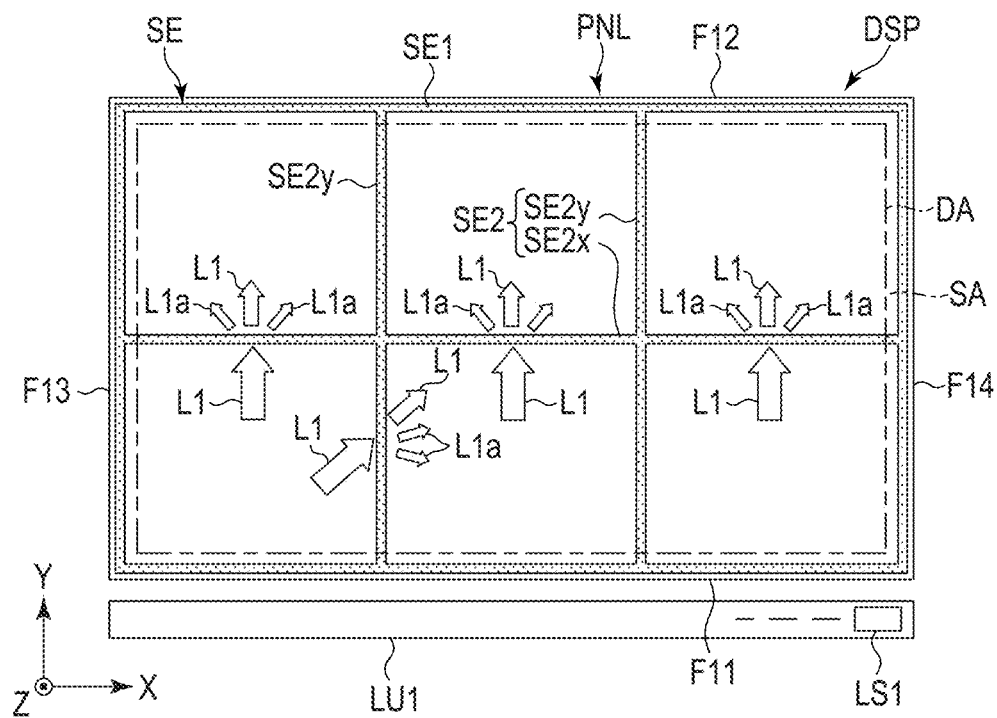
FIG. 15 is a schematic plan view showing a display device according to an eighth embodiment.
Figure 16:
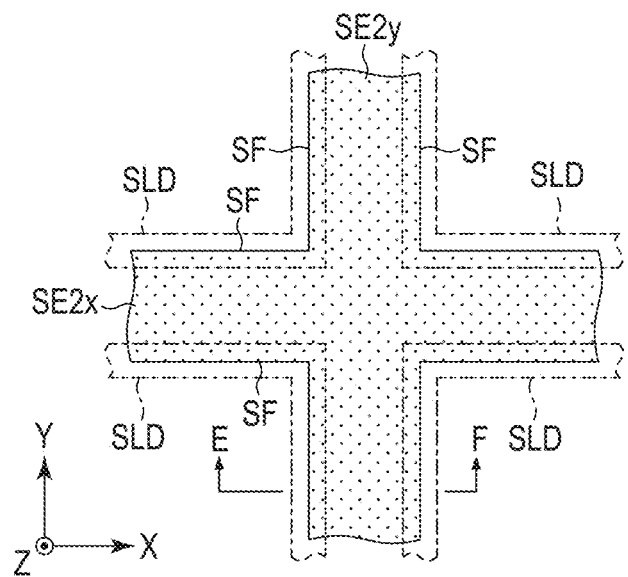
FIG. 16 is an enlarged and schematic plan view showing a part of a second sealing member according to the eighth embodiment.

FIG. 15 is a schematic plan view showing a display device DSP according to the eighth embodiment. FIG. 16 is an enlarged and schematic plan view showing a part of the second sealing member SE2. The display device DSP shown in FIG. 15 comprises a display panel PNL and a first light source unit LU1. The display device DSP may further comprise a second light source unit LU2, similarly to the example of FIG. 10.

A liquid crystal layer LC (polymer and liquid crystal molecules) and a second sealing member SE2 are different in refractive index from each other. For this reason, part of light L1 from first light sources LS1 can be reflected on an interface between the liquid crystal layer LC and the second sealing member SE2. When reflected light L1a is emitted from the display panel PNL, unnecessary light leakage occurs and the display quality is degraded.

Therefore, in the present embodiment, light shielding portions SLD are arranged as shown in FIG. 16. The light shielding portions SLD overlap with an interface between the liquid crystal layer LC and the second sealing member SE2, i.e., side surfaces SF of a first portion SE2x and a second portion SE2y, in plan view.

The light shielding portion SLD includes a portion extending in the first direction X along the side surface SF of the first portion SE2x, and a portion extending in the second direction Y along the side surface SF of the second portion SE2y. As an example, the light shielding portion SLD has a frame shape surrounding a first area A1.

In the example of FIG. 16, a width of the light shielding portion SLD is smaller than widths of the first portion SE2x and the second portion SE2y. Furthermore, the light shielding portion SLD does not overlap with a central portion of the first portion SE2x in the second direction Y or a central portion of the second portion SE2y in the first direction X.

Figure 17:
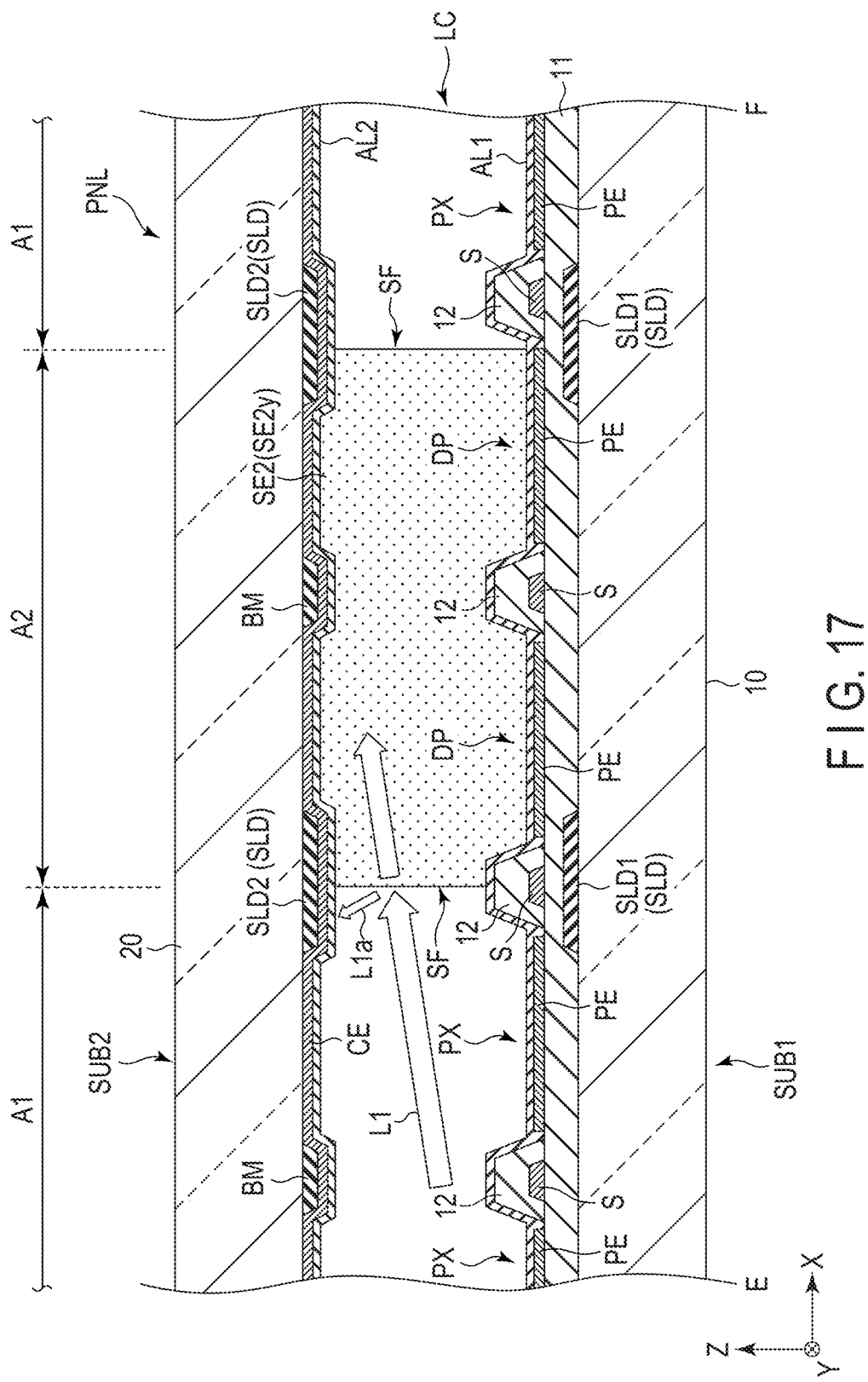
FIG. 17 is a schematic cross-sectional view showing the display panel along line E-F in FIG. 16.

FIG. 17 is a schematic cross-sectional view showing the display panel PNL along line E-F in FIG. 16. For example, the light shielding portion SLD includes a first light shielding portion SLD1 arranged on the first substrate SUB1, and a second light shielding portion SLD2 arranged on the second substrate SUB2.

For example, the first light shielding portion SLD1 is arranged between a first transparent substrate 10 and an insulating layer 11. For example, the second light shielding portion SLD2 is arranged between a second transparent substrate 20 and a common electrode CE. The first light shielding portion SLD1 and the second light shielding portion SLD2 are formed of a metal having a small reflectance of visible light or a material having a light shielding property such as black resin. The second light shielding portion SLD2 may be formed of the same material as the black matrix BM. In this case, the second light shielding portion SLD2 may be connected with the black matrix BM.

The first light shielding portion SLD1 is opposed to the second light shielding portion SLD2 in the third direction Z. The side surface SF of the second sealing member SE2 is located between the first light shielding portion SLD1 and the second light shielding portion SLD2. For example, planar shapes of the first light shielding portion SLD1 and the second light shielding portion SLD2 correspond to each other. However, the planar shapes of the light shielding portions SLD1 and SLD2 may be different at least partially.

In the example of FIG. 17, part of the light L1 is reflected on the side surface SF (i.e., the interface between the liquid crystal layer LC and the second sealing member SE2), and reflected light L1a is thereby generated. Such reflected light L1a is absorbed into the first light shielding portion SLD1 or the second light shielding portion SLD2. For this reason, occurrence of light leakage is suppressed.

The light shielding portion SLD may not comprise either of the first light shielding portion SLD1 and the second light shielding portion SLD2. In this case, too, an advantage of reducing the light leakage to the side of the substrate on which the light-shielding portion is provided, of the first substrate SUB1 and the second substrate SUB2, can be obtained.

Ninth Embodiment

A ninth embodiment will be described. As regards constituent elements of a display device DSP which are not particularly described, the same elements as those of each of the above-described embodiments can be applied.

Figure 18:
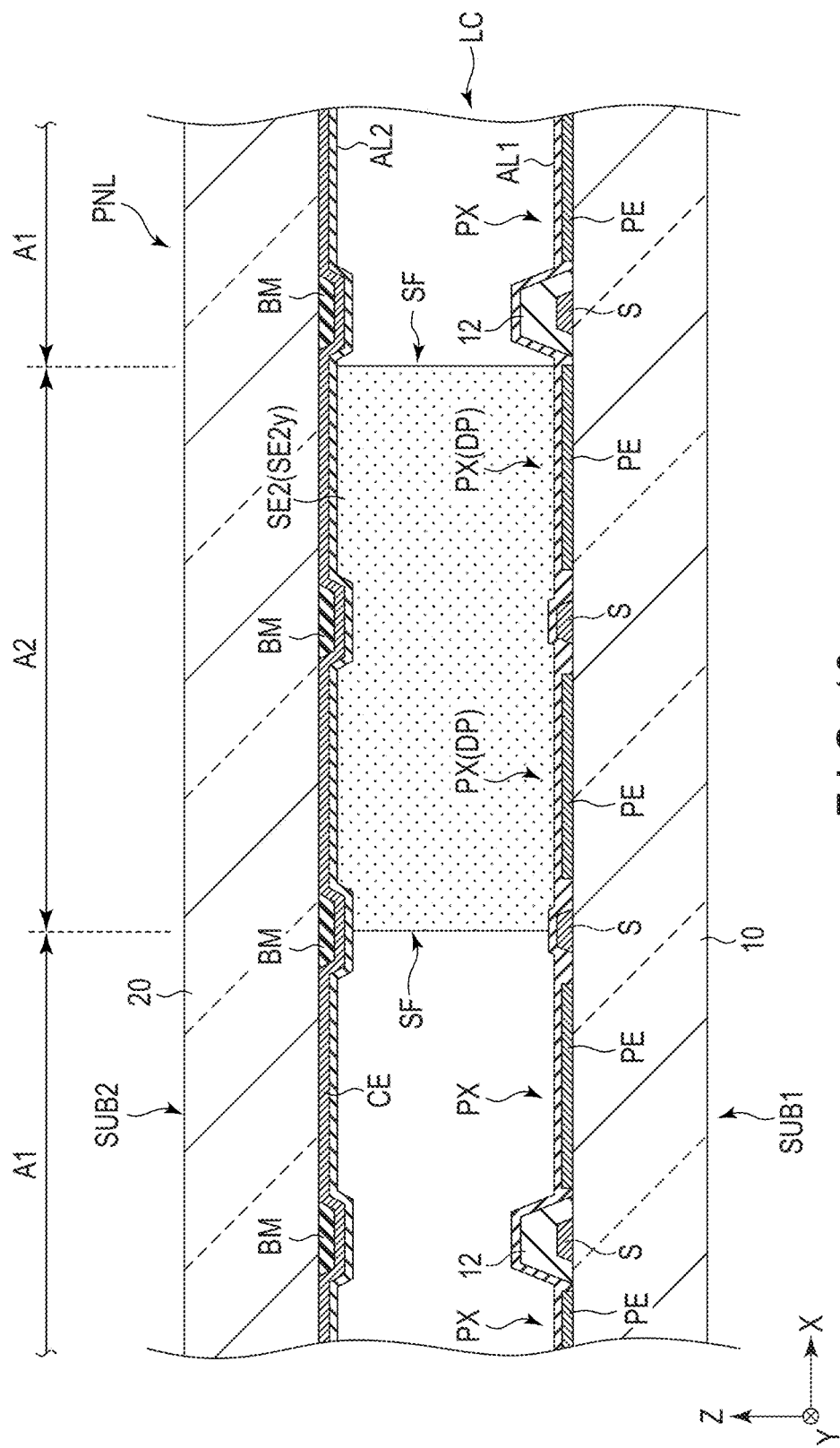
FIG. 18 is a schematic cross-sectional view showing a display device according to a ninth embodiment.

FIG. 18 is a schematic cross-sectional view showing the display device DSP according to the ninth embodiment. In the present embodiment, an insulating layer 12 is not provided in a second area A2. In other words, the insulating layer 12 is arranged at a portion which does not overlap with the second sealing member SE2 in plan view, of a boundary of a plurality of pixels PX, and the insulating layer 12 is not arranged at a portion which overlaps with the second sealing member SE2 in plan view, of the boundary of a plurality of pixels PX.

Therefore, a surface of a first alignment film AL1 in the second area A2 is more planar than a surface of the first alignment film AL1 in a first area A1. Pixels arranged in the second area A2 may be general pixels PX similarly to the first embodiment or may be dummy pixels DP similarly to the third embodiment.

FIG. 18 shows a cross-section including a second portion SE2y, but the same configuration can be applied to a cross-section including a first portion SE2x. In other words, the insulating layer 12 overlapping with scanning lines G may not be provided in the second area A2.

In the configuration of the present embodiment, the shape of the second sealing member SE2 can be made stable since a ground of the second sealing member SE2 is comparatively flat.

Tenth Embodiment

A tenth embodiment will be described. As regards constituent elements of a display device DSP which are not particularly described, the same elements as those of each of the above-described embodiments can be applied.

Figure 19:
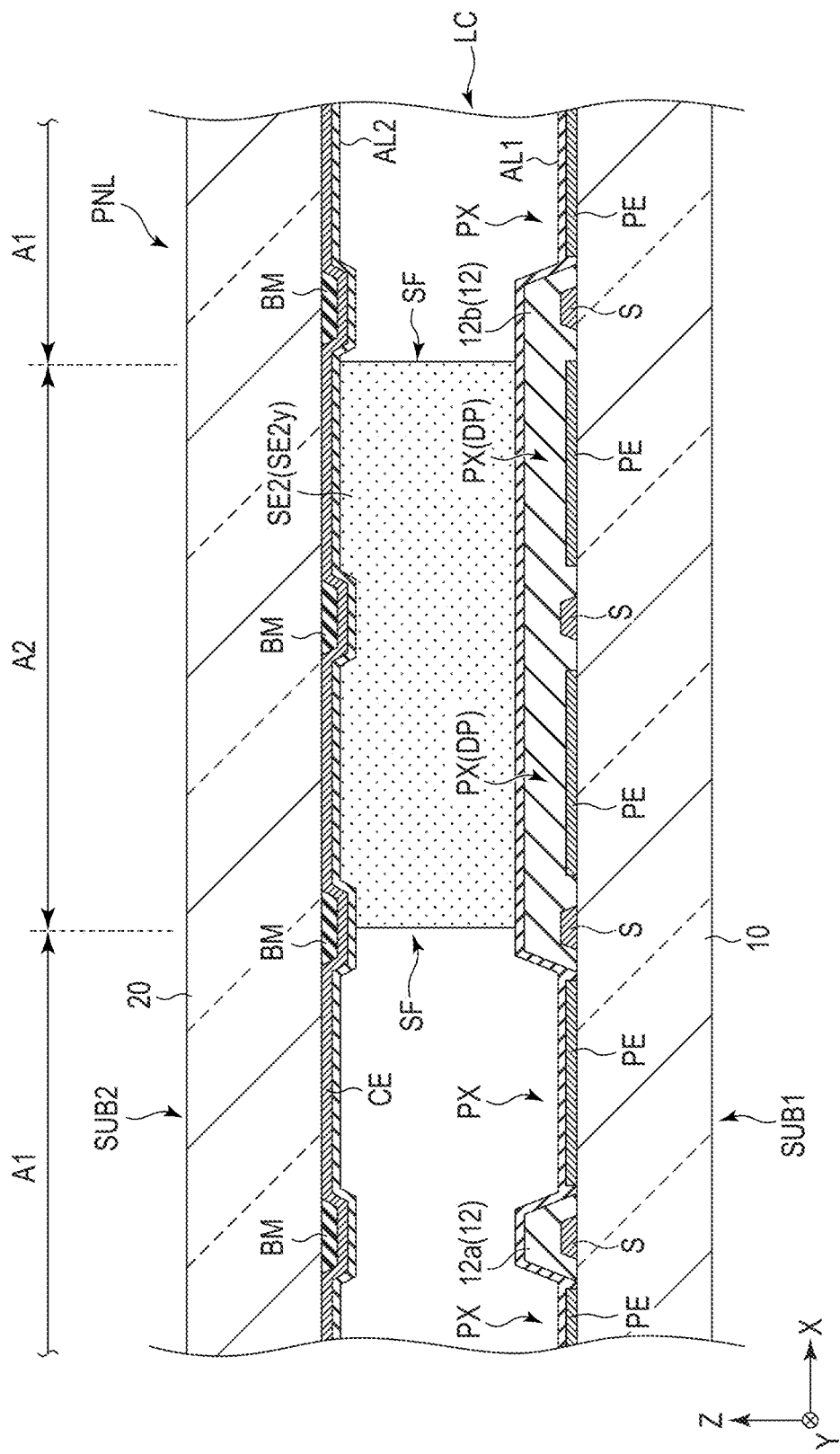
FIG. 19 is a schematic cross-sectional view showing a display device according to a tenth embodiment.

FIG. 19 is a schematic cross-sectional view showing the display device DSP according to a tenth embodiment. In the present embodiment, an insulating layer 12 includes a first insulating layer 12a arranged in a first area A1, and a second insulating layer 12b arranged in a second area A2. The first insulating layer 12a and the second insulating layer 12b are formed of the same material, and each of them is covered with a first alignment film AL1.

The first insulating layer 12a is provided above scanning lines G and signal lines S, similarly to the insulating layer 12 in each of the above-described embodiments, and protrudes toward a liquid crystal layer LC. In other words, the first insulating layer 12a is arranged at a portion which does not overlap with the second sealing member SE2 in plan view, of the boundary of the plurality of pixels PX.

The second insulating layer 12b has a width larger than a width of the first insulating layer 12a, and is entirely provided between the second sealing member SE2 and a first transparent substrate 10. In the example of FIG. 19, a width of the second insulating layer 12b is larger than a width of the second sealing member SE2.

FIG. 19 shows a cross-section including a second portion SE2y, but the same configuration can be applied to a cross-section including a first portion SE2x. The second insulating layer 12b may also be arranged similarly under a first sealing member SE1.

Pixels arranged in a second area A2 may be general pixels PX similarly to the first embodiment or may be dummy pixels DP similarly to the third embodiment. The second insulating layer 12b covers these pixels PX or the dummy pixels DP.

In the configuration of the present embodiment, a height of the second sealing member SE2 becomes stable. Therefore, a cell gap between a first alignment film AL1 and a second alignment film AL2 can be made uniform at each portion of the display area DA.

Modified Example of Second Sealing Member SE2

A shape of the second sealing member SE2 is not limited to that disclosed in the first to tenth embodiments. The other configuration that can be applied to the second sealing member SE2 will be exemplified below.

Figure 20:
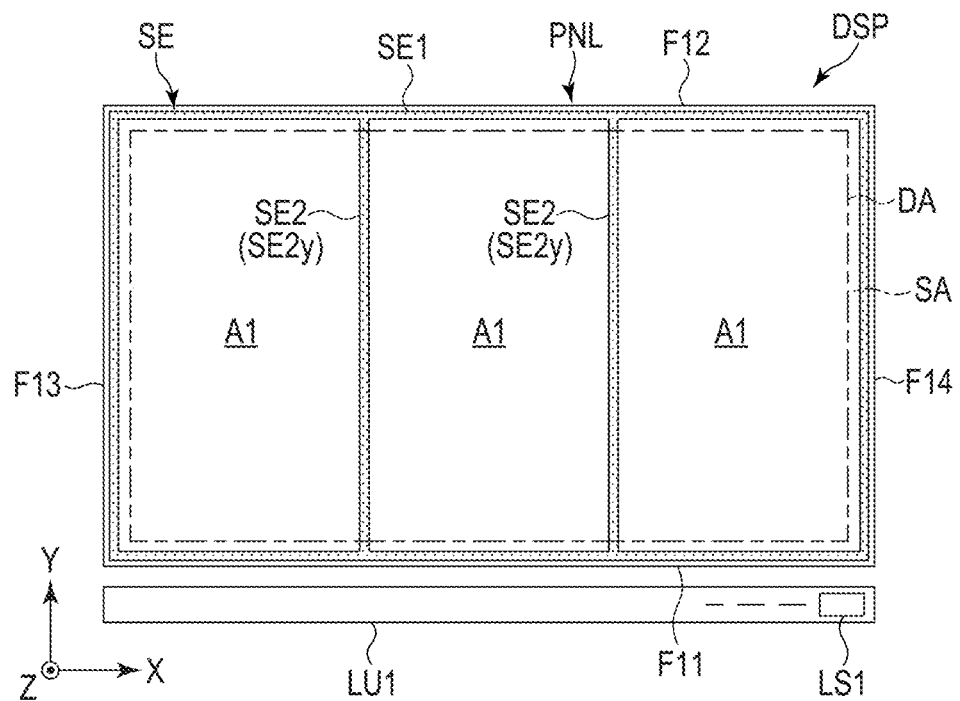
FIG. 20 is a plan view showing a first modified example of the second sealing member.

FIG. 20 is a plan view showing a first modified example of the second sealing member SE2. In the example of FIG. 20, two second sealing members SE2 are arranged in the display area DA. These second sealing members SE2 extend parallel to the second direction Y, similarly to the above-described second portions SE2y. The number of second sealing members SE2 is not limited to two, but may be one or may be three or more.

In the example of FIG. 20, the second sealing member SE2 does not include a portion extending in the first direction X. In this case, light guided from first light sources LS1 can hardly be disturbed by the second sealing member SE2.

Figure 21:
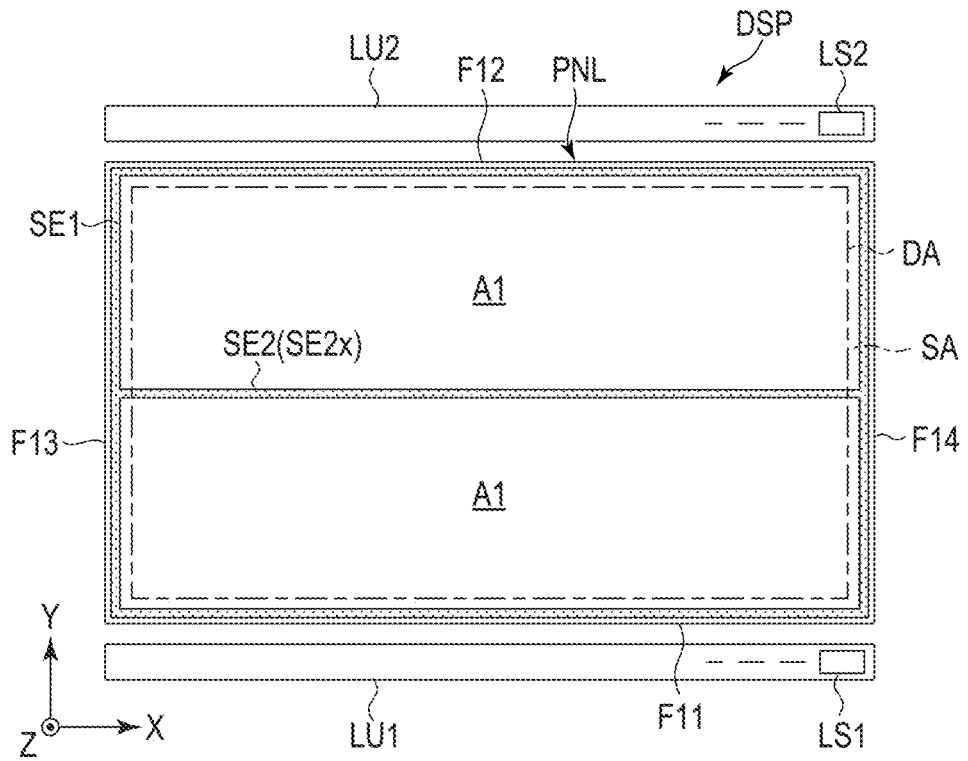
FIG. 21 is a plan view showing a second modified example of the second sealing member.

FIG. 21 is a plan view showing a second modified example of the second sealing member SE2. In the example of FIG. 21, one second sealing member SE2 is arranged in the display area DA. The second sealing member SE2 extends parallel to the first direction X, similarly to the above-described first portion SE2x. In the example of FIG. 20, the second sealing member SE2 does not include a portion extending in the second direction Y.

In the example of FIG. 21, two first areas A1 arranged in the second direction Y are formed in the display area DA. In this case, a second light source unit LU2 similar to the example of FIG. 10 may be arranged to make luminance uniform in each of the first areas A1.

Figure 22:
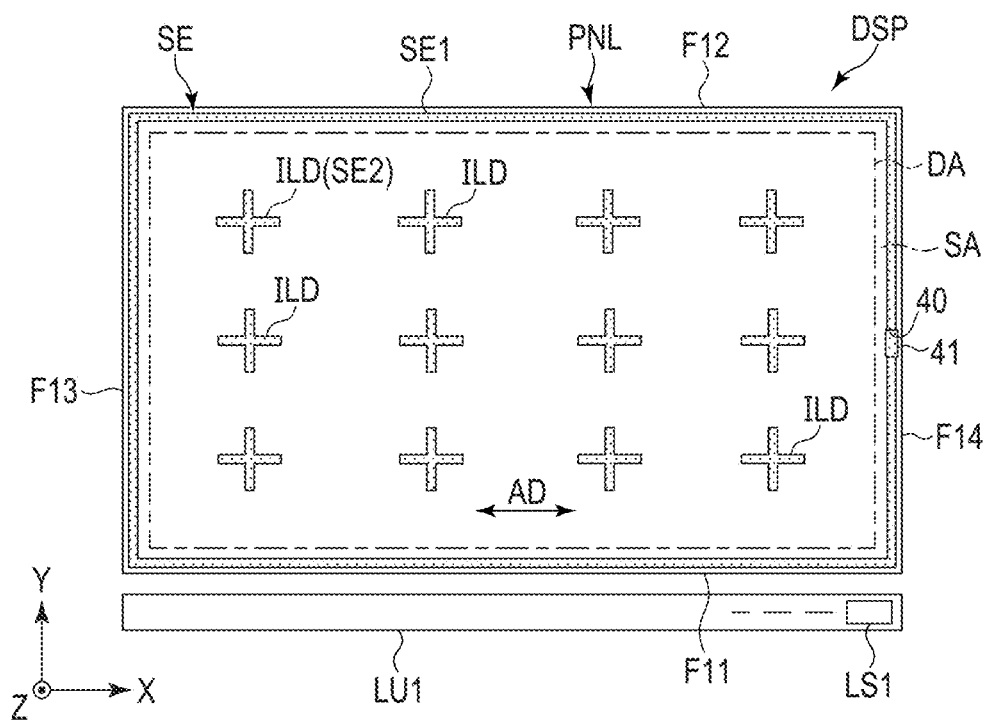
FIG. 22 is a plan view showing a third modified example of the second sealing member.

FIG. 22 is a plan view showing a third modified example of the second sealing member SE2. In the example of FIG. 22, the second sealing member SE2 includes a plurality of island portions ILD arranged inside the first sealing member SE1. These island portions ILD are arranged at intervals in the first direction X and the second direction Y. In the example of FIG. 22, the island portion ILD has a cross shape including a portion extending in the first direction X and a portion extending in the second direction Y.

Figure 23:
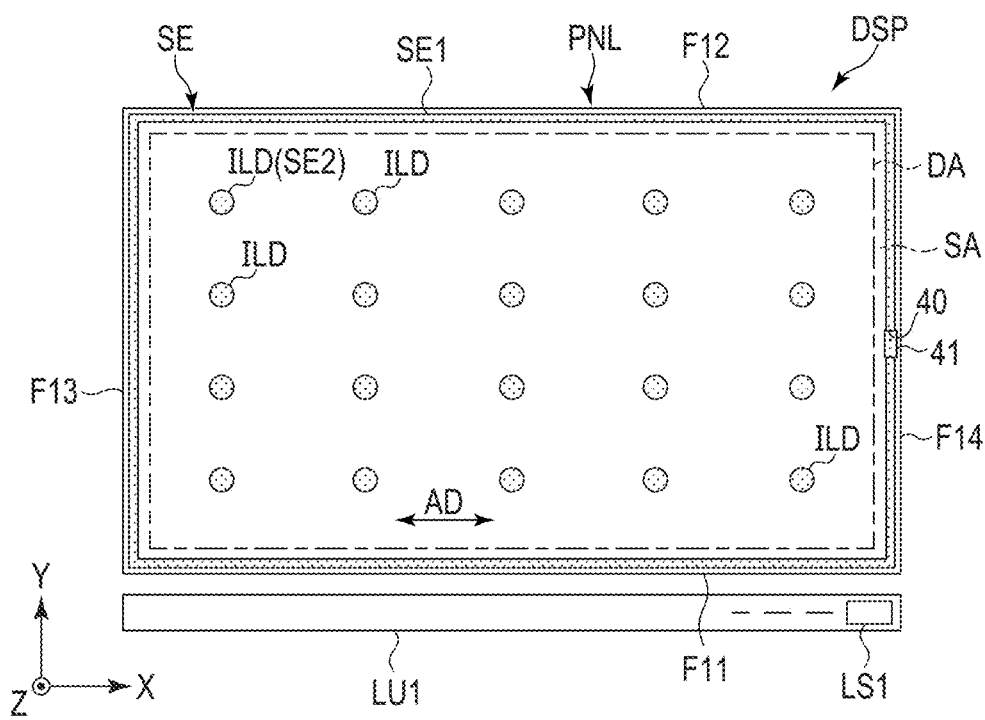
FIG. 23 is a plan view showing a fourth modified example of the second sealing member.

FIG. 23 is a plan view showing a fourth modified example of the second sealing member SE2. In the example of FIG. 23, too, the second sealing member SE2 includes a plurality of island portions ILD arranged at intervals in the first direction X and the second direction Y. In the example of FIG. 23, however, the island portion ILD has a circular shape. A diameter of the island portion ILD is larger than, for example, a width of the first sealing member SE1 or the pixel PX.

In the examples of FIG. 22 and FIG. 23, the inside of the first sealing member SE1 is not divided into a plurality of areas by the second sealing member SE2. For this reason, the liquid crystal layer LC can easily be formed.

In other words, when the above-described drop method is employed, expansion of the dropped liquid crystal material is hardly hindered by the second sealing member SE2. In addition, when the above-described injection method is employed and the liquid crystal material is injected through one inlet, the liquid crystal material spreads over the inside of the first sealing member SE1.

In the examples of FIG. 22 and FIG. 23, an inlet 40 of the liquid crystal material is provided at a portion parallel to the second direction Y, of the first sealing member SE1, and the inlet 40 is closed by a sealing member 41. When the inlet 40 and the sealing member 41 are provided at such a portion, the light guided from the first light sources LS1 can hardly be hindered by the inlet 40 and the sealing member 41.

The first alignment film AL1 and the second alignment film AL2 are assigned an alignment restriction force by, for example, rubbing treatment. An alignment treatment direction AD in which the rubbing treatment is performed is desirably orthogonal to the direction of guiding the light from the first light source LS1. In other words, in the examples of FIG. 22 and FIG. 23, the alignment treatment direction AD is parallel to the first direction X. In this case, when the inlet 40 is provided at the position shown in FIG. 22 and FIG. 23, the injected liquid crystal material desirably spreads along the alignment treatment direction AD.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:
1. A display device comprising:
a first substrate;
a second substrate opposed to the first substrate;
a sealing member bonding the first substrate with the second substrate; and
a liquid crystal layer between the first substrate and the second substrate,
wherein
the sealing member includes:
a first sealing member surrounding a display area including a plurality of pixels; and
a second sealing member formed of a same material as the first sealing member and arranged in the display area, wherein
the second substrate includes a light shielding portion including an aperture,
the display area includes a first area which does not overlap with the second sealing member in plan view, and a second area which overlaps with the second sealing member in plan view,
an aperture ratio of the light shielding portion in the first area is equivalent to an aperture ratio of the light shielding portion in the second area, and
the second sealing member overlaps the aperture of the light shielding portion in the second area.

2. The display device of claim 1, wherein
the second sealing member overlaps with at least one of the pixels in plan view.

3. The display device of one of claim 1, wherein
the pixels are not arranged in an area which overlaps with the second sealing member in plan view.

4. The display device of claim 1, wherein
the display area includes a dummy pixel which does not display an image, and
the second sealing member overlaps with the dummy pixel.

5. The display device of claim 4, wherein
the first substrate comprises:
a first pixel electrode arranged in one of the pixels and overlapping with the liquid crystal layer in plan view;
a second pixel electrode arranged in the dummy pixel and overlapping with the second sealing member in plan view;
a first switching element connected to the first pixel electrode;
a second switching element connected to the second pixel electrode;
a first scanning line connected to the first switching element;
a second scanning line connected to the second switching element;
a first signal line connected to the first switching element; and
a second signal line connected to the second switching element.

6. The display device of claim 5, further comprising:
a gate driver connected to the first scanning line and the second scanning line, wherein
the gate driver is configured to apply a voltage in which a low electric potential and a high electric potential are alternately repeated, to the first scanning line, and to apply a constant voltage of the low electric potential to the second scanning line.

7. The display device of claim 5, further comprising:
a common electrode to which a common voltage is applied; and
a source driver connected to the first signal line and the second signal line, wherein
the source driver is configured to apply a display voltage different from the common voltage to the first signal line, and to apply the common voltage to the second signal line.

8. The display device of claim 1, further comprising:
a first light source configured to emit light to a first side surface of the first substrate or the second substrate, wherein
the liquid crystal layer is constituted by polymer dispersed liquid crystal.

9. The display device of claim 8, further comprising:
a second light source configured to emit light to a second side surface of the first substrate or the second substrate.

10. The display device of claim 1, further comprising:
a wall portion covering a side surface of the second sealing member.

11. The display device of claim 1, wherein
the first substrate and the second substrate are flexible.

12. The display device of claim 1, wherein
the light shielding portion overlapping with a side surface of the second sealing member in plan view and extending along the side surface.

13. The display device of claim 1, wherein
the second sealing member partitions an inside of the first sealing member into a plurality of areas.

14. The display device of claim 1, wherein
the second sealing member includes a plurality of island portions arranged at intervals inside the first sealing member.

15. A display device comprising:
a first substrate;
a second substrate opposed to the first substrate;
a sealing member bonding the first substrate with the second substrate; and
a liquid crystal layer between the first substrate and the second substrate,
wherein
the sealing member includes:
a first sealing member surrounding a display area including a plurality of pixels; and
a second sealing member formed of a same material as the first sealing member and arranged in the display area; and
the first substrate further comprises an insulating layer protruding to the liquid crystal layer,
the insulating layer is arranged at a portion which does not overlap with the second sealing member in plan view, of a boundary of the pixels, and
the insulating layer is not arranged at a portion which overlaps with the second sealing member in plan view, of the boundary of the pixels.

16. A display device comprising:
a first substrate;
a second substrate opposed to the first substrate;
a sealing member bonding the first substrate with the second substrate; and
a liquid crystal layer between the first substrate and the second substrate,
wherein
the sealing member includes:
a first sealing member surrounding a display area including a plurality of pixels; and
a second sealing member formed of a same material as the first sealing member and arranged in the display area; and
the first substrate comprises:
a first insulating layer protrudes to the liquid crystal layer and arranged at a portion which does not overlap with the second sealing member in plan view, of a boundary of the pixels; and
a second insulating layer formed of a same material as the first insulating layer, having a width larger than the first insulating layer, and overlapping with the second sealing member in plan view.

* * * * *